United States Patent [19]
Saneyoshi et al.

[11] Patent Number: 5,410,346
[45] Date of Patent: Apr. 25, 1995

[54] SYSTEM FOR MONITORING CONDITION OUTSIDE VEHICLE USING IMAGED PICTURE BY A PLURALITY OF TELEVISION CAMERAS

[75] Inventors: Keiji Saneyoshi; Keiji Hanawa, both of Tokyo, Japan

[73] Assignee: Fuji Jukogyo Kabushiki Kaisha, Tokyo, Japan

[21] Appl. No.: 31,728

[22] Filed: Mar. 15, 1993

[30] Foreign Application Priority Data

Mar. 23, 1992 [JP] Japan .................................. 4-065347

[51] Int. Cl.⁶ .............................................. H04N 7/18
[52] U.S. Cl. ...................................... 348/116; 348/118; 348/148; 364/424.02
[58] Field of Search ............... 348/118, 116, 113, 148, 348/143; 364/424.01, 424.02

[56] References Cited

U.S. PATENT DOCUMENTS

| | | | |
|---|---|---|---|
| 3,812,636 | 5/1974 | Albrecht et al. | 52/334 |
| 4,872,051 | 10/1989 | Dye | 348/113 |
| 4,916,302 | 4/1990 | Sorimachi | 356/1 |
| 4,926,346 | 5/1990 | Yokoyama | 364/424.02 |
| 4,970,653 | 11/1990 | Kenue | 348/118 |
| 4,985,847 | 1/1991 | Shioya et al. | 364/516 |
| 5,081,585 | 1/1992 | Kurami et al. | 348/118 |
| 5,161,632 | 11/1992 | Asayama | 348/118 |
| 5,253,050 | 10/1993 | Karasudani | 348/118 |

FOREIGN PATENT DOCUMENTS

| | | |
|---|---|---|
| 48-2927 | 12/1973 | Japan . |
| 55-27708 | 2/1980 | Japan . |
| 59-197816 | 11/1984 | Japan . |
| 1-242916 | 9/1989 | Japan . |
| 1242916 | 9/1989 | Japan . |

Primary Examiner—Tommy P. Chin
Assistant Examiner—Bryan S. Tung
Attorney, Agent, or Firm—Beveridge, DeGrandi, Weilacher & Young

[57] ABSTRACT

A distance between a running vehicle and an object is determined over an imaged picture with high reliability. Three-dimensional objects or a road shape along with accurate position or dimension are also detected. An object within a set region outside a vehicle is imaged by a stereoscopic optical system to input the imaged picture of the object into a stereoscopic picture processing apparatus. The stereoscopic picture processing apparatus processes the picture imaged by the stereoscopic optical system to calculate a distance distribution over the entire picture. A road/three-dimensional object detecting apparatus calculates three-dimensional positions of respective portions of objects corresponding to information of the distance distribution to detect the shape of the road and a plurality of three-dimensional objects by using information of these three-dimensional positions securely and with high reliability.

8 Claims, 24 Drawing Sheets 26.5m    78.9m   30.0m (DETECTION DISTANCE)

SYSTEM FOR MONITORING CONDITION OUTSIDE VEHICLE USING IMAGED PICTURE BY A PLURALITY OF TELEVISION CAMERAS

BACKGROUND OF THE INVENTION

The present invention relates to a system for monitoring conditions outside a vehicle, which is adapted to image an object in a predetermined range outside a vehicle and then to distinguish the shape of the object and road from the imaged picture.

Many vehicles are used in our modern society because an automobile is so convenient for transporting persons or articles. Accordingly, many automatic accident avoiding systems are being developed recently. In view of this, development of technologies capable of automatically avoiding accidents without sacrificing the excellent features of automobiles have been conventionally conducted.

For automatically avoiding collision between the vehicle and objects, it is very important to detect an obstacle or obstruction on a path way of the vehicle. In addition, it is necessary to recognize a course along which the automobile runs, and to grasp the position of the object on the road. And thus it is important to judge whether or not the road condition is dangerous. For example, in the case where a road is curved or bent, it is necessary to detect the obstacle along the curve.

Such systems have already been developed as detecting an obstacle by using a radar (radiation detecting and ranging), an ultrasonic wave, a laser (light amplification by stimulated emission of radiation), and etc. However, these systems can detect only the object existing in a specific direction, but not recognize the road shape, nor grasp the positional relationship between the obstacle and the road.

Accordingly, a distance measurement system has recently been used as an effective method. The system images a sight as an object outside the vehicle by an imaging device such as a camera mounted on the vehicle to process the imaged pictures to detect objects such as other vehicles and the road shape to obtain a distance between the vehicle and an object.

Recognition/distance measurement systems using pictures are generally classified into two technical categories. One is to estimate the distance between a running car and the object by measuring a relative distance between a camera position and the image by a single camera. The other is based on a so called stereoscopic method, which obtains the distance between the car and the object by principle of a triangulation after a plurality of pictures are imaged at several positions sequentially changed by a plurality of cameras or the single camera.

As a technology to detect the obstacle or the road shape from a two-dimensional picture of the image taken by a single camera, for example, Japanese patent application laid-open No. 1-242916 (1989) discloses the technique in which a television camera is mounted in a cabin near a center portion at a top of a front window, the obstacle and the white line on the road are detected by using pictures obtained therefrom in dependency on a luminance distribution pattern on a certain survey line in the image and the two-dimensional luminance distribution pattern, and the three-dimensional position of the white line and the obstacle is estimated in dependency on parameters such as mounting position or a directional and visual field of TV cameras.

However, an actual picture of the road has so many objects such as buildings and trees in the surroundings, that it is difficult to precisely detect the various objects such as a running car in front, an oncoming car, a pedestrian, a pole for a telephone or electric light and a white line across a road from such a two-dimensional picture (pattern of feature). Namely, there are circumstances where such technologies cannot be put into practice with sufficient reliability. Furthermore, there is the problem that an estimation of the three-dimensional position has a large error when the three-dimensional position of a white line or the obstacle is estimated from a parameter of the television camera where the surface of the road is uneven, the road has a rising or falling gradient and the vehicle is pitching.

On the other hand, a more precise distance can be obtained by a relative discrepancy of the position of the same object in left and right pictures through the technique of the stereoscopic method of obtaining the distance on the basis of triangulation from a plurality of the pictures.

For example, Japanese patent application laid-open No. 59-197816 (1984) discloses a method for calculating a three-dimensional position of an obstacle by using the principle of triangulation in which two television cameras are mounted on a front part of the vehicle, the obstacle is detected by a two-dimensional luminance distribution pattern with respect to respective images of each television camera, and the positional discrepancy of the obstacle on two pictures is obtained. However, with this prior art, it is difficult to detect the obstacle for respective pictures. Namely, this technology also does not have sufficient reliability as described above.

Further, in Japanese Patent laid open No. 48-2927 (1973) and the Japanese Patent Laid Open No. 55-27708 (1980), two television cameras are attached to right and left ends in front of the vehicle. Each picture is spatially differentiated to extract only a dark/light changing point, and an image scanned by one camera is delayed by a predetermined time to superpose on another picture, thus to extract only a three-dimensional object from the characteristics of a change in brightness of the three-dimensional object of portions in correspondence with each other in two pictures. However, actual pictures are complicated. For example, in the case where a picture has a plurality of three-dimensional objects, a large number of points where the brightness changes appears, so it is impossible to obtain a correspondent relationship with respect to a plurality of three-dimensional objects. Accordingly, even with these technologies, it is difficult to precisely detect the object.

As described above, in actual complicated circumstances, it is extremely difficult to precisely detect the distance, the three-dimensional object, positional relationship or the shape from the imaged picture.

SUMMARY OF THE INVENTION

This invention has been made in view of the above circumstances, and has an object to provide a system for monitoring a condition outside a vehicle, which is adapted to determine, from an imaged picture, a distance distribution over the entire picture, thus making it possible to detect a correct position or dimension of a three-dimensional object or a road shape with high reliability.

The system for monitoring the conditions outside the vehicle according to the basic concept of the present invention comprises a picture system for imaging a plurality of pictures of objects from a different direction in a limited area outside a vehicle, picture processing means for processing the plurality of pictures imaged by the picture imaging system to calculate a distance distribution over an entire picture at a high speed; road/three-dimensional object detecting means for calculating a three-dimensional position of the object corresponding to information of the distance distribution, and thus to detect a road shape-and a plurality of three-dimensional objects by using the information of the three-dimensional positions at a high speed.

A system for monitoring conditions outside a vehicle according to the first aspect of this invention is characterized, in the monitoring apparatus of the basic concept of this invention, by the provision of positional relationship amount detecting means for detecting, at a high speed, an amount of positional relationship between a detected three-dimensional object and a vehicle on the monitoring side of the vehicle over changes in time of three-dimensional positions of the three-dimensional object detected by the road/three-dimensional object detecting means; and collision judgment means for judging the possibility of collision between the three-dimensional object detected by the road/three-dimensional object detecting means and the vehicle from the amount of positional relationship detected by the positional relationship amount detecting means in view of a running route of the vehicle concerned obtained by the road shape detected by the road/three-dimensional object detecting means.

A system for monitoring conditions outside a vehicle according to the second aspect of this invention is characterized in that the road/three-dimensional object detecting means defined in the basic concept of this invention of the monitoring system of the first aspect is composed of road shape estimating means for estimating position and shape of a white line on a road on the basis in information of a distance distribution from the picture processing means; first three-dimensional window setting means for setting, as a first three-dimensional window, a three-dimensional space area including the white line on the road estimated by the road shape estimating means; linear element detecting means for extracting only data within the first three-dimensional window from information in the distance distribution to detect three-dimensional linear elements constituting a road model; road shape judgment means for judging reasonableness of the linear elements detected by the linear element detecting means to modify or change the linear elements when a judged result does not correspond with criterion, thus to determine the road model; data extracting means for extracting only data above the road surface from information of the distance distribution on the basis of the road model determined by the road shape judgment means; object detecting the means for detecting presence or absence and an existing position of an object from data extracted by the data extracting means for every plural area obtained by dividing a picture having information of the distance distribution to thereby detect a plurality of objects in a manner to distinguish them from the background; second three-dimensional window setting means for setting, as a second three-dimensional window, a three-dimensional space area including the object detected by the object detecting means; and object contour image extracting means for extracting only data within the second three-dimensional window from the information of the distance distribution to detect a contour image of the object, and to detect dimension and position of the contour image.

A system for monitoring conditions outside a vehicle according to the third aspect is characterized in that, in the linear element detecting means defined in the monitoring apparatus according to the second aspect, an approach is employed to extract only data within the first three-dimensional window and thereafter to multiply the extracted data by weighting coefficients, thus to derive a three-dimensional linear expression with respect to the linear elements by the least square.

A system for monitoring conditions outside a vehicle according to the fourth aspect of this invention is characterized in that, in the linear element detecting means defined in the monitoring system according to the second aspect, an approach is employed to extract only data within the first three-dimensional window and thereafter to derive a three-dimensional linear expression with respect to the linear elements by the Huff transformation.

A system for monitoring conditions outside a vehicle according to the fifth aspect of this invention is characterized in that, in the monitoring system according to the second aspect, there is provided object discrimination means for discriminating the kind of object from the dimension and the position of the contour image of the object detected by the object contour image extraction means.

In the basic concept of this invention, an approach is employed to image a plurality of pictures of an object in a set range outside a vehicle from positions different from each other, to process the plurality of imaged pictures at a high speed to calculate a distance distribution over the pictures, and to calculate three-dimensional positions of respective portions of the object corresponding to information of the distance distribution, thus to detect a road shape and a plurality of three-dimensional objects at a high speed by using information of those three-dimensional positions.

In accordance with the monitoring system of the first aspect, an approach is employed in the basic concept to judge the possibility of collision between detected three-dimensional objects and a vehicle on the monitoring side of the vehicle from an amount of positional relationship between detected three-dimensional objects and the vehicle concerned in view of a running route of the vehicle concerned obtained by the detected road shape.

In accordance with the second aspect, in the basic concept or the first aspect, in order to detect a road shape and a plurality of three-dimensional objects, position and shape of a white line on the road are estimated on the basis of information of a distance distribution to set, as a first three-dimensional window, a three-dimensional space area including the estimated white line on the road thereafter to extract only data within the first three-dimensional window from information of the distance distribution, thus to detect three-dimensional linear elements constituting a road model. Then, reasonableness of these linear elements is judged to modify or change those linear elements when a judged result does not correspondence with the criterion, thus to determine a road model. In addition, only data above the road surface is extracted from information of a distance distribution on the basis of the determined road model to detect the presence or absence and an existing position of an object for every respective area obtained by dividing a picture having information of the distance distribution to thereby detect a plurality of objects in a manner to distinguish from the background. Thereafter, a three-dimensional space area including the detected object is set as a second three-dimensional window to extract only data within the second three-dimensional window from the information of the distance distribution to detect a contour image of the object, and to detect dimension and position of the contour image.

In accordance with the third aspect, detection of linear elements in the second aspect is carried out by extracting only data within the first three-dimensional window and thereafter to multiply the extracted data by weighting coefficients to derive a three-dimensional linear expression with respect to linear elements by the least square method.

In accordance with the fourth aspect, detection of linear elements in the second aspect is carried out by extracting only data within the first three-dimensional window and thereafter to derive a three-dimensional linear expression with respect to linear elements by the Huff transformation.

Finally, in accordance with the fifth aspect, the kind of object is discriminated from the dimension and the position of a detected object.

As described above, in accordance with this invention, a distance distribution over an entire imaged picture is determined at a high speed from the imaged picture, thereby making it possible to detect, precisely and with high reliability, a road shape such as the end portion of a road or a white line, etc. and a three-dimensional position of three-dimensional object in the surroundings. Accordingly, this invention can advantageously realize an avoidance of an obstacle of higher qualify in which position and/or movement of an obstacle to which could prevent the vehicle from running is taken into consideration.

DETAILED DESCRIPTION OF THE PREFERRED EMBODIMENTS

Preferred embodiments of this invention will be described with reference to the attached drawings. A system for monitoring conditions outside a vehicle according to a first embodiment will be first described with reference to FIGS. 1 to 37.

Figure 1:
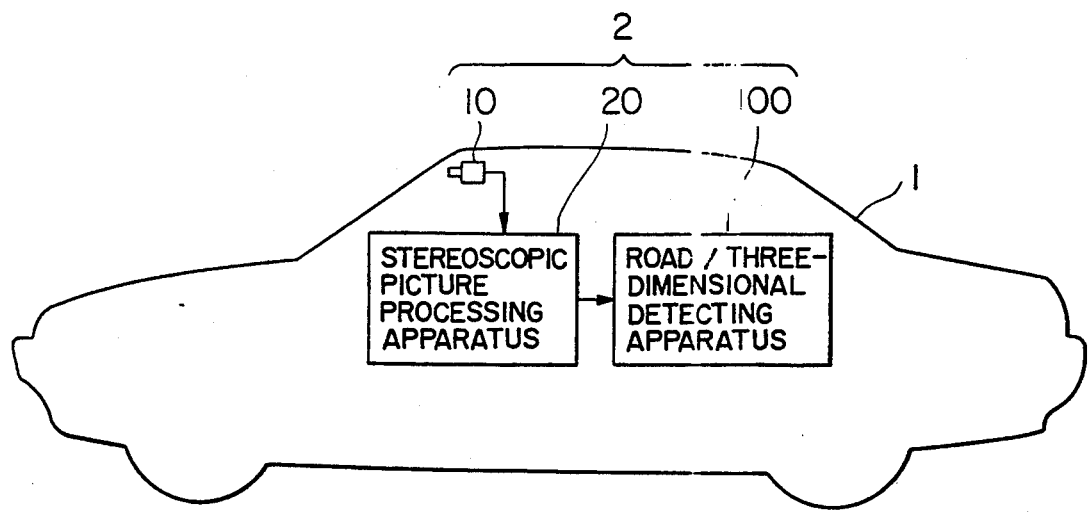
FIG. 1 is a schematic diagram showing the entirety of a system for monitoring conditions outside a vehicle according to the present invention.

In FIG. 1, reference numeral 1 denotes a vehicle such as an automobile, etc. In the vehicle 1, a system 2 for monitoring conditions outside a vehicle is mounted. The monitoring system 2 serves to image an object within a set region outside the vehicle to recognize objects from an imaged picture, and thus to monitor conditions outside the vehicle.

The monitoring system 2 comprises a stereoscopic optical system 10 as an imaging system for taking the optical image within a predetermined area outside the vehicle, and a stereoscopic picture processing apparatus 20 as picture processing means for processing a picture imaged by the stereoscopic optical system 10 to calculate the three-dimensional distance distribution information, and a road/three-dimensional detecting apparatus 100 as road/three-dimensional detecting means adapted for inputting distance information from the stereoscopic picture processing apparatus 20 to detect, at a high speed, road shape and/or three-dimensional positions of a plurality of three-dimensional objects from the distance information. The monitoring system 2 is connected to an external device for controlling actuators (not shown), or the like, thus making it possible to perform an operation such as a warning to a driver or an automatic collision avoidance of the vehicle, etc. when the recognized object is considered as an obstacle to the vehicle 1.

Figure 2:
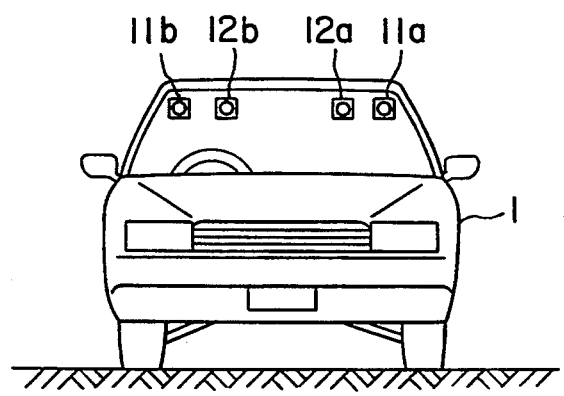
FIG. 2 is a front view showing a vehicle in which the system of the first embodiment is mounted.

The stereoscopic optical system 10 is configured by a CCD camera using a solid-state imaging element such as a charge coupled device (CCD), etc. As shown in FIG. 2, the optical system 10 has two CCD cameras 11a and 11b (represented by 11 if necessary) for right and left angles of a long distance which are respectively attached with a predetermined spacing therebetween on the front side of the ceiling in the room, and two CCD cameras 12a and 12b (represented by 12 if necessary) for right and left angles of a short distance which are respectively attached at a fixed interval on the inside of the long-distance CCD cameras 11a, 11b.

Figure 3:
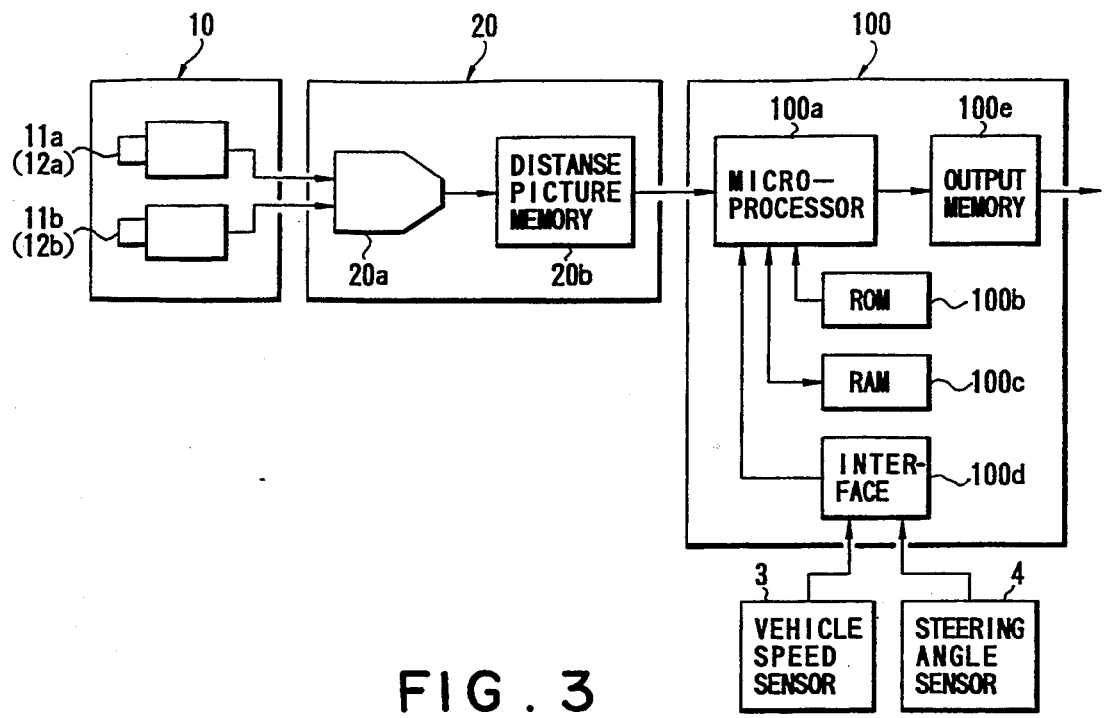
FIG. 3 is a block diagram showing a circuit configuration of the system of the present invention.

Further, as shown in FIG. 3, the stereoscopic picture processing apparatus 20 is composed of a distance detection circuit 20a adapted for inputting two left and right picture signals from the stereoscopic optical system 10 to detect the portion where two pictures have the same object for every very small area of pictures to execute, over the entirety of the pictures, processing to calculate distance from an object based upon an amount of discrepancy of position on that picture, and a distance picture memory 20b for storing distance information as an output of the distance detection circuit 20a.

In addition, the road/three-dimensional detecting apparatus 100 comprises, a microprocessor 100a for reading out distance information written in the distance picture memory 20b to carry out various calculation processing, and further includes a Read Only Memory (ROM) 100b in which a control program is stored, a Random Access Memory (RAM) 100c for storing various parameters in the middle of the calculation processing, an interface circuit 100d, and an output memory 100e for storing parameters of processed results. To the interface circuit 100d, a vehicle speed sensor 3 attached on the vehicle 1 and a steering angle sensor 4 for detecting a steering angle of a steering wheel are connected.

The microprocessor 100a inputs a distance picture through the distance picture memory 20b to execute calculation processing to output parameters of a road shape or an obstacle as a processed result to the output memory 100e. External equipment connected to the road/three-dimensional detection apparatus 100 receives these parameters from the output memory 100e.

It is sufficient for the stereoscopic optical system 10 to actually measure the position from 2 to 100 meters in front of the vehicle 1 when the CCD cameras 11 and 12 in the room of the vehicle 1 are mounted or attached at a position inwardly from the top end of the hood by two meters, in the case where the distance measurement is performed from immediately before the vehicle to the position distant, e.g., by 100 meters therefrom.

Figure 4:
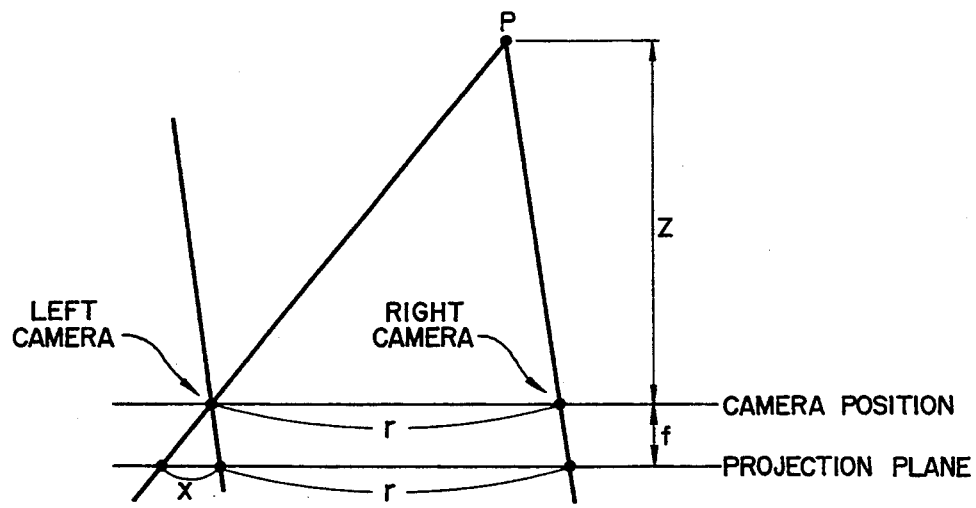
FIG. 4 is an explanatory view showing the relationship between a camera and an object in the system of the first embodiment.

Namely, as shown in FIG. 4, in the case where an attachment distance between the CCD cameras 11a and 11b for a long distance is designated as r, and a picture of a point P distant by z from the surface of the installation of two cameras 11a, 11b, if the focal lengths two cameras 11a, 11b are assumed as f, an image of the point P is taken on the plane of projection distant by f from the camera positions with respect to respective cameras.

At this time, a distance from the position of the picture by the right CCD camera 11b to the position of the picture by the left camera 11a is expressed as "r+δ". If δ is assumed as an amount of discrepancy, the distance Z to the point P can be obtained as a function of the discrepancy amount by the following equation (1):

$$Z = r \times f / \delta \qquad (1)$$

In order to detect such discrepancy amounts in the left and right pictures, it is necessary to find an image of the same object in the left and right pictures. In accordance with the present invention, in the stereoscopic picture processing apparatus 20 which will be described later, a scheme is employed to divide a picture into small regions to compare patterns of brightness or patterns of color within the respective small regions with respect to the left and right pictures to find a region where they correspond to each other, thus to determine a distance distribution over the entire image plane. Accordingly, it is possible to avoid lowering of an amount of information, which was conventionally encountered with a method of extracting any feature such as an edge, a line segment, or spatial form, etc. to find out the portion where these features are in correspondence with each other.

The degree of coincidence between the left and right pictures can be evaluated by the city-block distance H algorithm shown by the following equation (2), for example. In this equation, the brightness (color) of the i'th pixels of the left and right pictures are represented by Ai and Bi, respectively. As understood from this equation, the speed of the calculation can be improved since there is no lowering of the amount of information due to the use of average values and no multiplicative calculation (operation).

$$H = \Sigma |Ai - Bi| \qquad (2)$$

In addition, if the size of the small region is divided into too large an area, there results a high possibility that an object remote from a reference point and an object close thereto may be mixed, so a distance to be detected becomes incorrect. Also in view of obtaining a distance distribution of a picture, it is desirable that the region to be divided is smaller in area. However, if such region is too small, the amount of information is insufficient for investigation of the coincidence.

For this reason, for example, so that a vehicle having a width of 1.7 meters and 100 meters ahead and a similar vehicle in an adjacent lane do not enter a small region, the lateral width of the region is made the maximum value and becomes four pixels with respect to the stereoscopic optical system 10. As the result of using this value as the basis for testing for the optimum number of pixels for an actual image, the width was made four pixels for both the lateral and longitudinal widths.

In the following description, it is assumed that a picture is divided into small regions of 4×4 pixels to investigate the degree of the coincidence of the left and right pictures, and that the stereoscopic optical system 10 is represented by the CCD cameras 11a and 11b for long distance.

Figure 5:
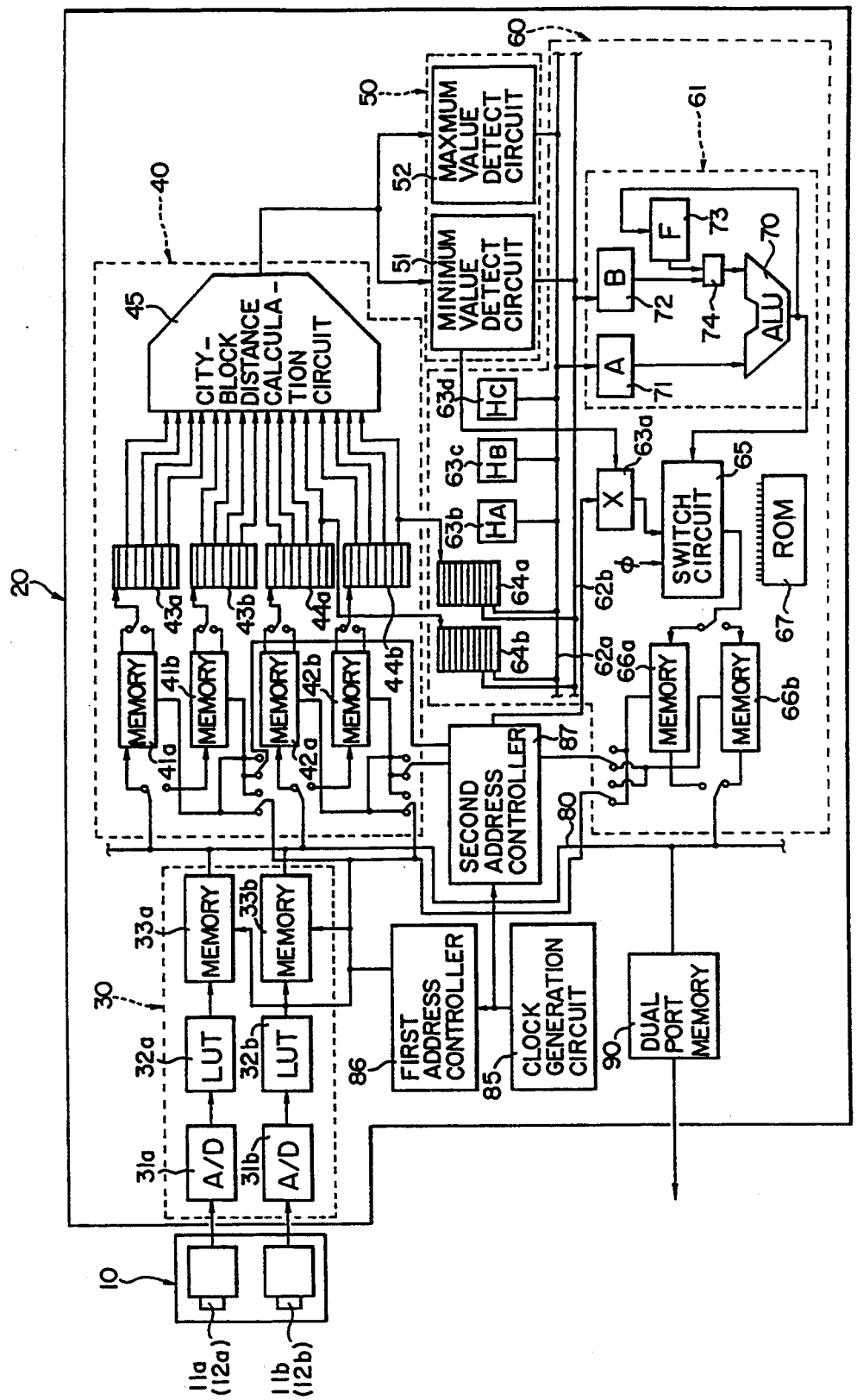
FIG. 5 is a circuit diagram showing a stereoscopic picture processing apparatus in the system of the first embodiment.

An actual circuit example of the stereoscopic picture processing apparatus 20 is shown in FIG. 5. In this circuit example, the distance detection circuit 20a comprises a picture conversion section 30 which converts analog pictures imaged by the stereoscopic optical system 10 into digital pictures, a city-block distance algorithm calculation section 40 which calculates city-block distances H for determining amounts of left and right pictures while shifting in succession one pixel at a time, a minimum/maximum value detection section 50 which detects a minimum value $H_{MIN}$ and a maximum value $H_{MAX}$ of the city-block distance H, and a discrepancy determination section 60 which determines a discrepancy amount by checking for whether or not the minimum value $H_{MIN}$ obtained by the minimum and maximum value detection section 50 indicates coincidence between the left and right small regions. In addition, a dual port memory is employed as the distance picture memory 20b.

In the picture conversion section 30 described above, there are provided the A/D converters 31a and 31b corresponding to the CCD cameras 11a and 11b for the left and right optical images. To the A/D converters 31a and 31b, there are respectively connected look-up tables (LUT) 32a and 31b serving as data tables, and picture memories 33a, 33b for storing pictures imaged by the CCD cameras 11a, 11b.

The A/D converters 31a and 31b have a brightness resolution of 8 bits, for example, and serve to convert the analog image data from the left and right CCD cameras 11a and 11b to digital image data having a required brightness gradation. More specifically, when binarization of brightness of an image is performed, it can increase the speed of the processing, however, there is a large loss in the amount of information for the calculation of the coincidence of the left and right pictures and so the brightness of each pixel is converted to gray scale divided into 256 gradations, for example.

In addition, the LUT 32a and 32b are configured on a read only memory (ROM) as a programed data. The LUT provide data to correct a contrast of a picture converted into digital quantities by the A/D converters 31a and 31b having low brightness, and to correct differences in the characteristics of the left and right CCD cameras 11a and 11b. Then, the signals which have been converted by the LUT 32a and 32b are stored in the picture memories 33a and 33b.

As will be described later, the picture memories 33a and 33b perform processing to repeatedly take one portion of the image data in the city-block distance calculation section 40 and so it is possible for them to be configured with a relatively low-speed memory, and thus enable the cost to be reduced.

In the city-block calculation section 40, a pair of input buffer memories 41a and 41b are connected via a shared bus 80 to the left picture memory 33a of the picture conversion section 30, and a pair of input buffer memories 42a and 42b are connected via the shared bus 80 to the right picture memory 33b.

To the pair of input buffer memories 41a and 41b for the left picture, a pair of shift registers 43a and 43b which have an 8-stage configuration are connected. In the same manner, a pair of 8-stage shift registers 44a and 44b are connected to the respective input buffer memories 42a and 42b for the right picture. Furthermore, a city-block distance calculation circuit 45, which calculates the city-block distance, is connected to these two pairs of shift registers 43a, 43b and 44a, 44b.

Further, a pair of 10-stage shift registers 64a and 64b of a discrepancy amount determination section 60 which will be described later are connected to the shift registers 44a and 44b for the right picture. When data transfer for the next small region is started, old data which has been already undergone calculation of the city-block distance H is sent to the shift registers 64a and 64b, and is used in determination of the discrepancy amount δ.

In addition, the city-block distance calculation circuit 45 is of a structure in which high-speed CMOS type calculators or operational elements 46 are combined, each element having one chip configuration such that an input/output latch is connected to an adder-subtracter. As shown in detail in FIG. 6, the city block circuit 45 has a pipeline structure in which 16 calculators are connected in a pyramid form, and is adapted to simultaneously input data, of eight pixels, to perform calculation. The first stage of this pyramid structure constitutes an absolute value calculator or operational element; the second through fourth stages constitute a first adder, a second adder and a third adder, respectively; and the final stage constitutes a total sum adder.

Figure 6:
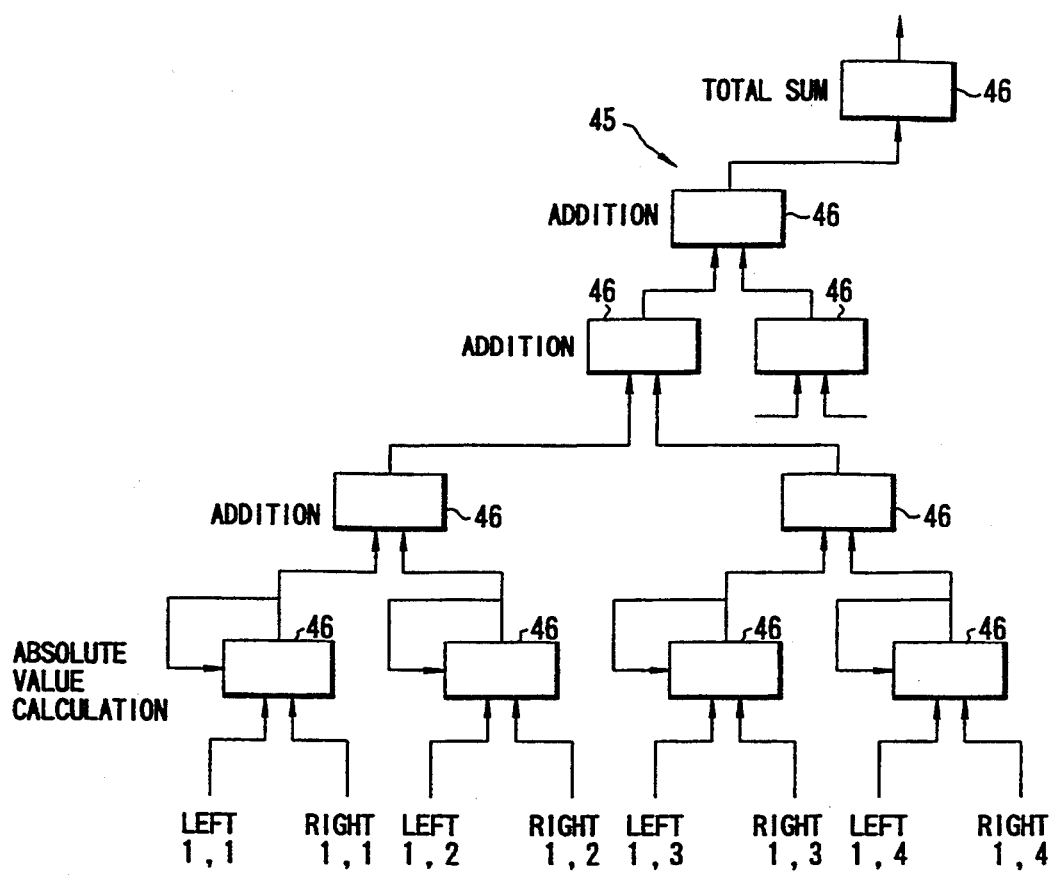
FIG. 6 is an explanatory view showing a city block distance calculation circuit in the system.

FIG. 6 shows only a half pair of the absolute value calculators and the adders of the first and second stages.

In addition, the input buffer memories 41a, 41b, 42a and 42b are of a relatively small storage type having the high-speed corresponding to the speed of city-block distance calculation, and the input and output are separated, while an address generated by a #1 address controller 86 is supplied to each of the buffer memories in accordance with a clock supplied from a clock generation circuit 85. In addition, transfer to and from the two pairs of shift registers 43a, 43b; 44a, 44b is controlled by a #2 address controller 87.

Moreover, if the calculation of the city-block distance H algorithm is performed by the software of a computer, it is necessary to conduct a successive search of the small region in the image plane on the left side with respect to one of the small regions of the image plane on the right side, and to carry out such search for the entire small region portion of the right image plane. When this calculation is performed in 0.08 seconds, for example, a calculation performance of 500 MIPS (mega-instructions per second) is required if a program of five steps is used for each pixel. This performance is unable to be realized with a current type of microprocessor of the CISC type, and so a RISC processor, a digital signal processor (DSP) or a parallel processor has to be used.

The minimum and maximum value detection section 50 is provided with a minimum value detection circuit 51 which detects a minimum value $H_{MIN}$ for the city-block distance H and a maximum value detection circuit 52 which detects a maximum value $H_{MAX}$ for the city-block distance H. This section 50 is of a structure such that calculators 46 employed in the city-block distance calculation circuit 45 are used for minimum and maximum value detection.

Figure 7:
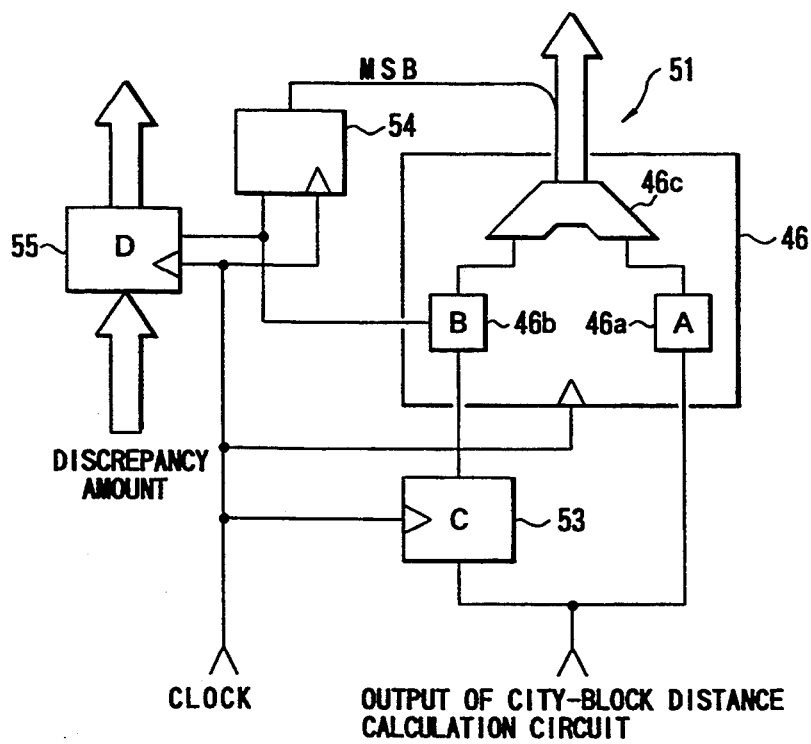
FIG. 7 is a block diagram showing a minimum value detection circuit in the system.

As shown in FIG. 7, the minimum value detection circuit 51 comprises a calculator 46 having an A-register 46a, a B-register 46b and an arithmetic logic calculation unit (ALU) 46c, and a C-latch 53, a latch 54 and a D-latch 55 which are connected thereto. An output from the city-block distance calculation circuit 45 is input to the A-register 46a and to the B-register 46b via the C-latch 53, and the most significant bit (MSB) of the output of the ALU 46 is output to the latch 54. The output of this latch 54 is output to the B-register 46b and to the D-latch 55, and a value in the middle of the minimum value calculation is preserved in the B-register 46b and the discrepancy amount δ at that time is preserved in the D-latch 55.

Moreover, the maximum value detection circuit 52 has the same configuration as the minimum value detection circuit 51 except for that the logic is inverted and in that the discrepancy amount δ is not stored.

City-block distances H are successively calculated as described above while the left picture small region is shifted one pixel at a time with respect to one of the right picture small regions. Every time the value of the city-block distance H is output, the comparison and renewal of the maximum value $H_{MAX}$ and the minimum value $H_{MIN}$ until that time determines the maximum value $H_{MAX}$ and the minimum value $H_{MIN}$ for the city-block distance H in that small region at substantially the same time as the output of the final city-block distance H.

The discrepancy amount determination section 60 is configured as a relatively small scale RISC processor, and is provided with a calculator 61, two 16-bit width data buses 62a and 62b, a latch 63a which holds the discrepancy amount δ, a latch 63b which holds the threshold value Ha as a first specified value, a latch 63c which holds the threshold value Hb as a second specified value, a latch 63d which holds the threshold value Hc as a third specified value, a pair of shift registers 64a and 64b which hold brightness data of a right picture, a switch 65 which receives the output of the calculator 61 and outputs the discrepancy amount δ or "0", output buffer memories 66a and 66b which temporarily hold the output results, and a 16 bit width read only memory (ROM) 67 in which the control program for the functions of the calculator 61 and the operation timing of the circuit is written.

The calculator 61 has the ALU 70 and comprises an A-register 71, a B-register 72, an F-register 73 and a selector 74. The A-register 71 is connected to the data bus 62a (hereinafter called the A-bus 62a). The B-register 72 is connected to the data bus 62b (hereinafter called the B-bus 62b). The switch 65 operates by the calculation results of the ALU 70 and either the discrepancy amount δ or "0" is stored into the output buffer memories 66a and 66b.

To the A-bus 62a, the latches 63b, 63c and 63d which store each of the threshold values Ha, Hb and Hc, and the maximum value detection circuit 52 are connected. Similarly, to the B-bus 62b, the minimum value detection circuit 51 is connected. Furthermore, to the A-bus 62a and the B-bus 62b, the shift registers 64a and 64b are connected.

In addition, to the switch circuit 65, the calculator 61 is connected, and the minimum value detection circuit 51 is also connected via the latch 63a. Thus, the three check conditions to be described later are judged by the calculator 61 and the output to the output buffer memories 66a and 66b is switched in dependency on those judgment results.

The discrepancy amount determination section 60 checks whether the obtained minimum value $H_{MIN}$ of the city-block distance H is in actual coincidence with the left and right small regions, and only when this condition is met, a corresponding discrepancy amount δ is output to the positions of pixels corresponding to the output buffer memories 66a and 66b.

More specifically, when the city-block distance H becomes minimum, the discrepancy amount is a required discrepancy amount δ. The discrepancy amount δ is output when the following three check conditions have been met while no data is used and "0" is outputted when the conditions are not met.

(A) $H_{MIN} \leq Ha$ (Distance is not detected when $H_{MIN} > Ha$.)

(B) $H_{MAX} - H_{MIN} \geq Hb$ (This is a condition for checking whether the obtained minimum value $H_{MIN}$ is clearly low due to oscillation resulting from noise, and does not check difference with the vicinity of the minimum value $H_{MIN}$, but rather checks the difference with the maximum value $H_{MAX}$ so that distance detection is performed with respect to objects with a curved surface for which the brightness changes gradually.)

(C) Brightness difference between adjacent pixels in a lateral direction inside a small region of a right picture Hc. (There is edge detection when the threshold value Hc becomes larger but it is also possible to have handling when the brightness changes gradually, by making the threshold value Hc lower than the normal edge detection level. This condition is based on the fundamental principle that distance detection cannot be performed in the small region which has no change in the brightness, and is performed for each pixel in a small region and so is used only for pixels for which distance has been actually detected for inside a small region, and produces a natural result.)

Moreover, if this discrepancy amount determination processing is performed by software with an ordinary microprocessor, it is necessary to have a speed of 27 MIPS, and it is impossible to execute such processing.

The distance distribution information which is the final result output from the discrepancy amount determination section 60 is written via a shared bus 80 into a dual port memory 90.

Figure 8:
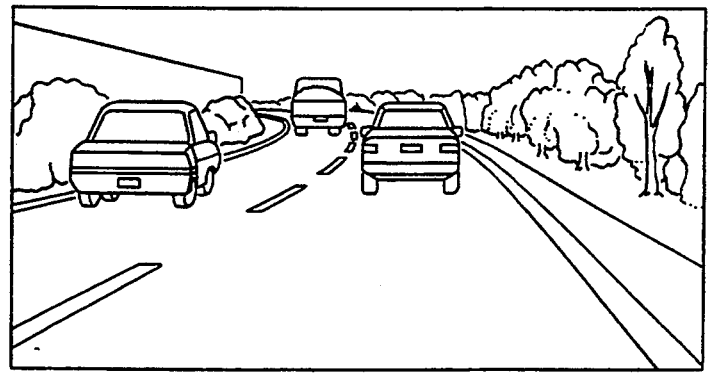
FIG. 8 is an explanatory view showing an example of a picture imaged by a vehicle mounted CCD camera in the system.

Distance distribution information output from the stereoscopic picture processing apparatus 20 explained above is in a form of picture (distance picture). When pictures are taken by two left and right CCD cameras 11a, 11b, two pictures (a picture taken by one camera is shown in FIG. 8) is processed by the stereoscopic picture processing apparatus 20, a picture as shown in FIG. 9 is provided.

Figure 9:
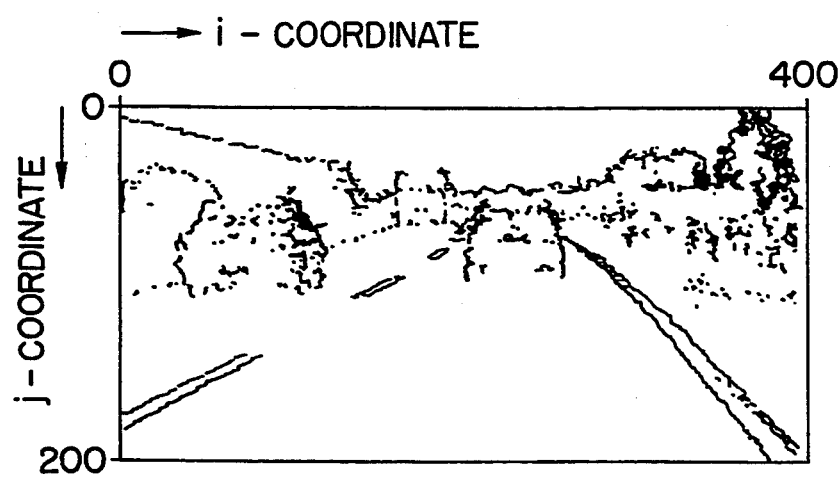
FIG. 9 is an explanatory view showing a distance picture by the system.

In the picture example shown in FIG. 9, the picture size is 400 pixels in a lateral direction by 200 pixels in a longitudinal direction. The portions having distance data are shown as the portions of black points. These portions are the portions where brightness varies to much degree between pixels adjacent in left and right directions of respective pixels of the picture of FIG. 8. The coordinate system on a picture is such that the origin is taken at the upper corner on the left side, an i-coordinate axis is taken in a lateral direction, a j-coordinate axis is taken in a longitudinal direction, and the unit is a pixel.

This distance picture is read into the road/three-dimensional detecting object apparatus 100. Thus, a plurality of objects such as other automobiles or obstacles, etc. existing on left and right traffic lanes adjacent to the lane of an automobile concerned are detected. Thus, their positions and dimensions, relative velocities with respect to the automobile concerned by changes in time of position, and the like are calculated. In addition, contour images of detected objects are extracted.

In this case, in the road/three-dimensional detection apparatus 100, three-dimensional information of an object is utilized. Thus, this apparatus carries out discrimination between a road and an object by height from the road surface, and carries out discrimination between an object and the background by a value of distance. To realize this, the road/three-dimensional object detecting apparatus 100 first transforms a coordinate system of distance pictures from the stereoscopic picture processing apparatus 20 to a coordinate system of a real space surrounding a corresponding vehicle (vehicle 1) to calculate positions and dimensions of detected road shapes or three-dimensional objects.

Figure 10:
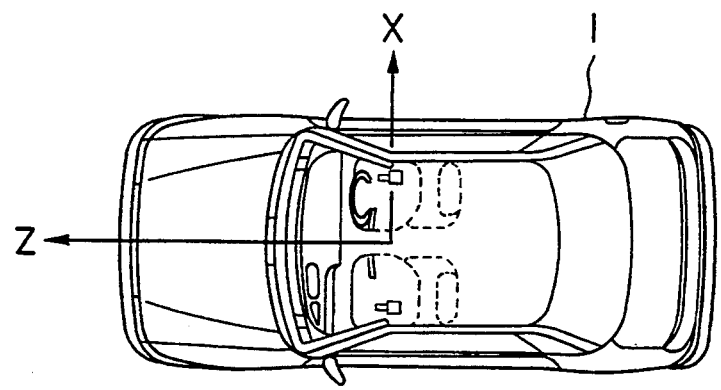
FIG. 10 is a plan view showing a vehicle provided with the system.
Figure 11:
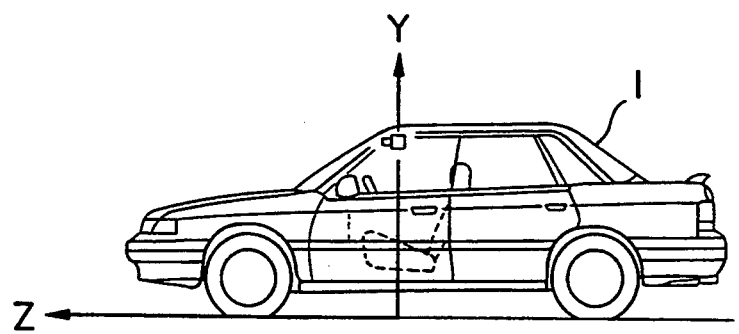
FIG. 11 is a side view showing a vehicle provided with the system.

Namely, as shown in FIGS. 10 and 11, assumption is made so that the coordinate system of real space is the coordinate system of the vehicle 1 such that the X-axis taken is in the lateral direction on the right side of the vehicle 1, the Y-axis is taken in an upper direction of the vehicle 1, the Z-axis is taken in a forward direction of the vehicle 1, and the origin is taken on the road surface immediately below the central portion of the two CCD cameras 11a (12b), 11b (12b). Thus, in the case where the road is flat, the XZ-plane (Y=0) corresponds with the road surface. In order to calculate the three-dimensional position (X, Y, Z) of an object from distance information (i, j, Z) in a picture, a sort of coordinate transformation is carried out by the following equations (3) and (4):

$$Y = CH - Z \times PW \times (j - JV) \quad (3)$$

$$X = r/2 + Z \times PW \times (i - IV) \quad (4)$$

where CH is an attachment height of the CCD camera (CCD camera 12), PW is an angle of visual field per pixel, and IV, JV are coordinates on a picture at infinite-points just-opposite to the vehicle 1.

Further, the equations for calculating a position (i, j) on a picture from the three-dimensional coordinates (X, Y, Z) of real space are given below by transforming the above-mentioned equations (3) and (4)

$$j = (CH - Y) / (Z \times PW) + JV \quad (5)$$

$$i = (X - r/2) / (Z \times PW) + IV \quad (6)$$

It is to be noted that when the attachment position of the CCD camera 11 is indicated by the XYZ coordinate system of real space, e.g., the positional parameter of the CCD camera 11b on the right side is such that X=0.45 m, Y=1.24 m and Z=0.0 m, and the positional parameter of the CCD camera 11a on the left side is such that X=−0.45 m, Y=1.24 m and Z=0.0 m.

Figure 12:
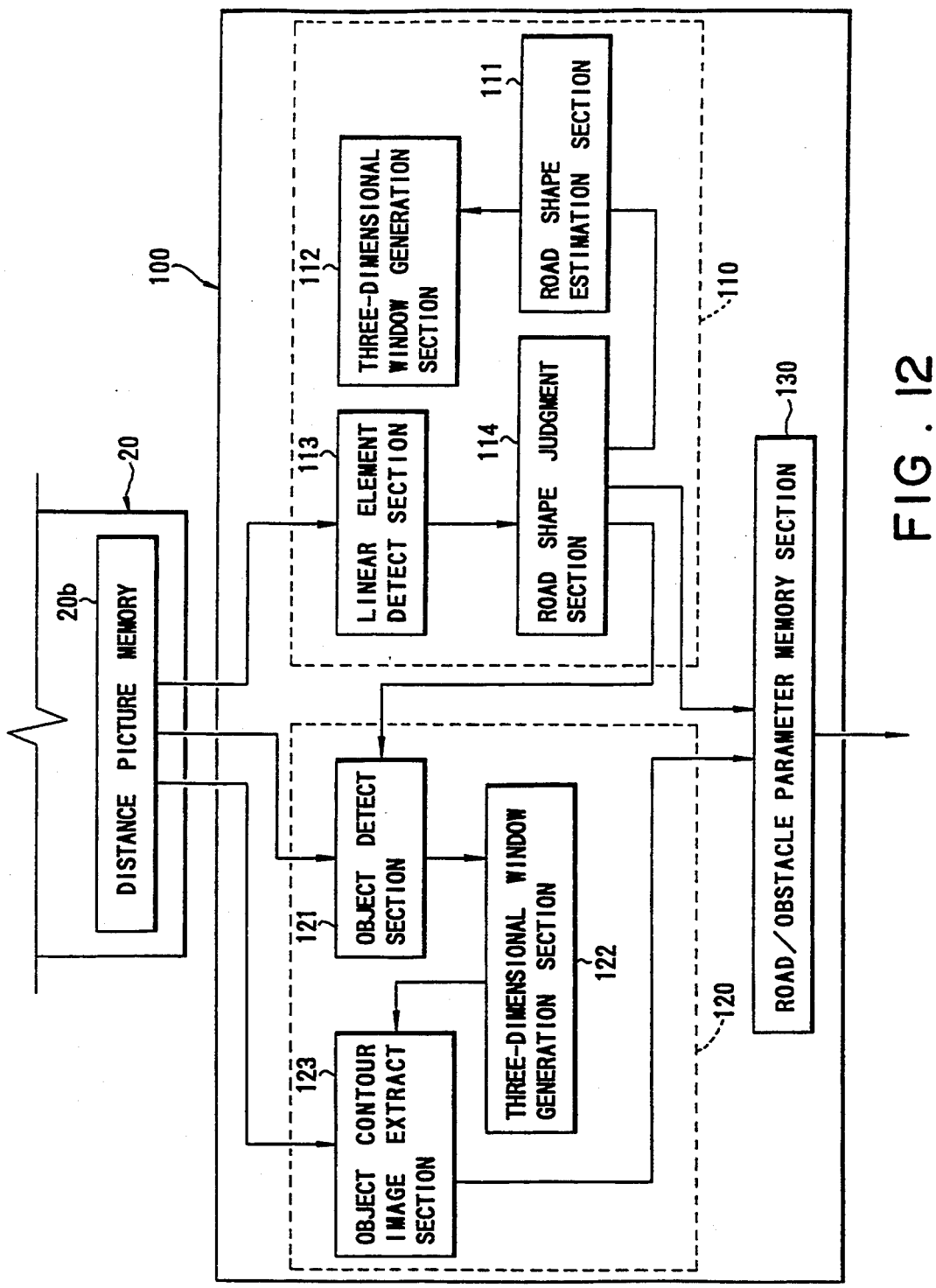
FIG. 12 is a block diagram showing functions of a road/three-dimensional detecting apparatus of the present invention.

The recognition function of the road/three-dimensional object detecting apparatus is roughly divided, as shown in FIG. 12, into a road detecting unit 110 and an object recognition unit 120. Respective processed results are stored into the output memory 100e as a road/three-dimensional parameter storage section 130, and are read into an external device (not shown).

More particularly, the road detecting unit 110 is composed of a road shape estimation section 111, a three-dimensional window generating section 112, a linear element detecting section 113, and a road shape judgment section 114. Moreover, the object recognition section 120 is composed of an object detecting section 121, a three-dimensional window generation section 122, and an object contour extraction section 123.

The road shape estimation section 111 has a function as road shape estimation means to estimate the position of a white line and the shape of a road on the basis of information of a distance distribution included in the distance picture, and the three-dimensional window generating section 112 has a function as first three-dimensional window setting means for setting, as a first three-dimensional window, a three-dimensional space area including the estimated white line on the road.

Further, the linear element detecting section 113 has a function as linear element detecting means to extract only data within the first three-dimensional window from information of the distance distribution to detect three-dimensional linear elements constituting a road model, and the road shape judgment section 114 has a function as road shape judgment means adapted for judging reasonabless of a detected linear element to modify or change the linear element in the case where the judged result is not in correspondence with a criterion, thus to determine the road model.

Furthermore, the object detecting section 121 has functions as data extraction means for extracting only data above the road surface from information of the distance distribution on the basis of the determined road model, and object detecting the means for detecting presence or absence and existing position of an object from the extracted data for every respective plural area obtained by dividing a picture having information of the distance distribution to thereby detect a plurality of objects in a manner to distinguish them from the background. Moreover, the three-dimensional window generating section 122 has a function as second three-dimensional window setting means for setting, as a second window, a three-dimensional space area including detected objects.

In addition, the object contour image extraction section 123 functions as object contour image extraction means for extracting only data within the second three-dimensional window from information of the distance distribution to detect a contour image of an object, and to detect dimension and position of that contour image, positional relationship amount detecting means for detecting, at a high speed, an amount of positional relationship between a detected three-dimensional object and the automobile on the monitoring side of the automobile from changes in time of the three-dimensional positions of the detected three-dimensional object, and collision judgment means for judging the possibility of collision between a detected three-dimensional object and the automobile concerned from the amount of positional relationship in view of a running route of the automobile concerned obtained by the detected road shape.

The road detecting section 110 utilizes three-dimensional position information by a distance picture stored in the distance picture memory 20b to extract only white lines on an actual road in such a manner that they are separated from the others to modify/change parameters of a road model included therein so that they correspond with an actual road shape.

In an actual picture, an image of a preceding vehicle, etc. appears on white lines on a road in an imposed manner. With many conventional apparatuses adapted for detecting white lines of a road appearing in a picture depending upon two-dimensional features, it is frequently impossible to separate white lines and three-dimensional objects by two-dimensional features. On the contrary, with this invention, by making use of three-dimensional position information of white lines, it is possible to securely separate white lines and three-dimensional objects.

Namely, in a three-dimensional space, white lines are on the plane of a road, and a three-dimensional object such as a preceding vehicle, etc. exists, on the other hand, at a position higher than the plane of the road. In view of this, there is adopted a method of discriminating between the white line and the three-dimensional object by height from the road surface.

Further, a road model is included or stored in the road detecting section 110. This road model is obtained by dividing a self-lane up to a recognition object range into a plurality of sections by set distances to approximate left and right white lines for every respective section by a three-dimensional equation described later to connect them in a form of polygonal line. In this road model, the range encompassed by left and right polygonal lines is judged as a lane for a running vehicle. In other words, it can be said that recognition of the road shape is a process to derive parameters of a three-dimensional linear expression.

Figure 13:
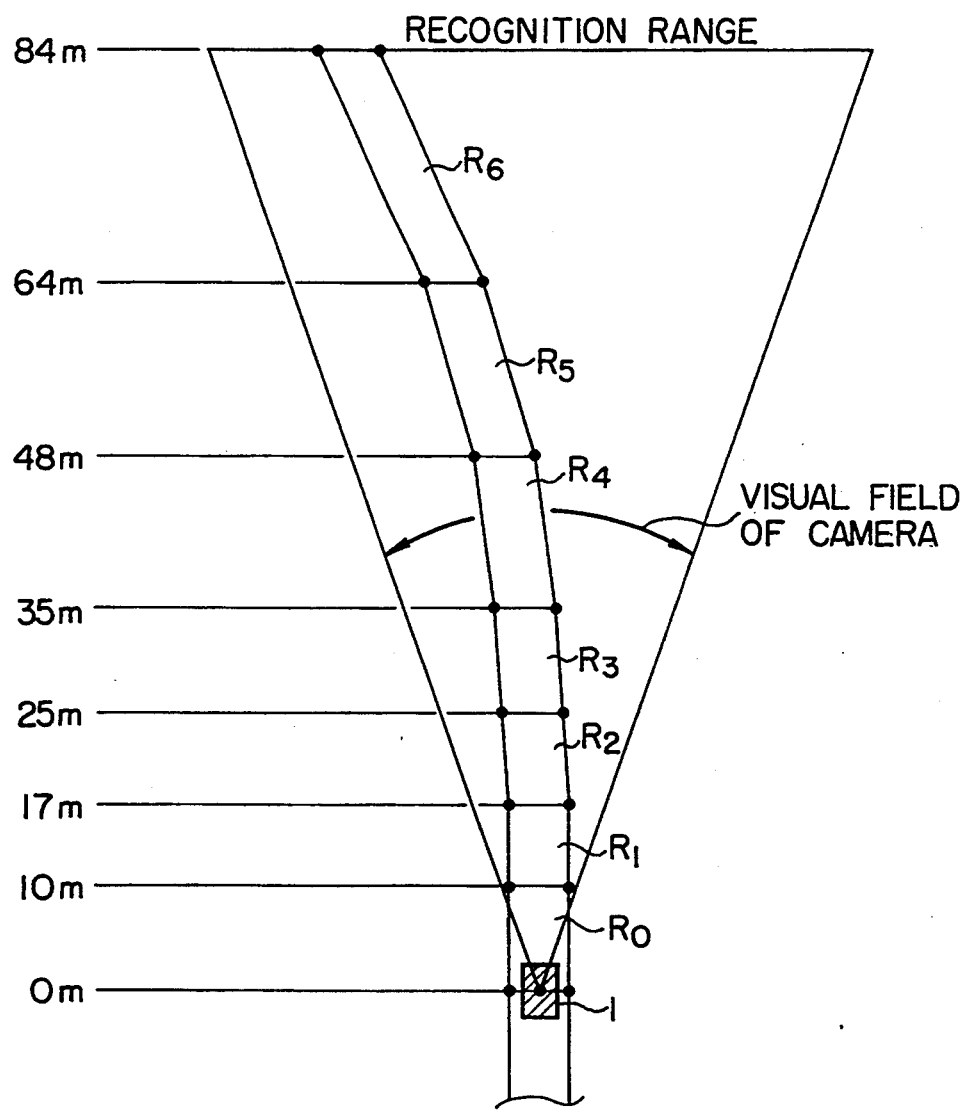
FIG. 13 is an explanatory view showing a road model used in the system.

FIG. 13 is an example of a road model. For example, a road in a range up to 84 m in front of a vehicle is divided into seven sections of the zeroth section R0, the first section R1, the second section R2, . . . , the sixth section R6 to represent a right curve by approximation. In this road model, there is employed a method of allowing a road to be represented by approximation by seven sections, thereby making it possible to represent, with sufficient precision, not only a linear path but also a curve or S-shaped path. Further, because respective sections are represented by lines, calculation processing and/or handling are simple. Further, as described later, respective sections can be represented with linear expressions in a horizontal direction and in a vertical direction, and shapes in upper and lower directions of a road such as the ups and the downs or unevenness, etc. of a road can be represented.

It is to be noted that it is necessary to change values of distances partitioning respective sections of the road model in dependency upon curvature of a curve of a road on which a vehicle runs. Since the radius of the curve is designed in general express high-ways roads so that it is equal to about 230 m at the minimum, satisfactory results can be provided in such cases when the distances partitioning respective sections are set to 10 m, 17 m, 25 m, 35 m, 48 m, 64 m and 84 m.

The function of the road detecting section 110 will now be described in detail. The road shape estimation section 111 calculates movement of the vehicle 1 for $\Delta t$ seconds by using output signals from the vehicle speed sensor 3 and the steering angle sensor 4 on the basis of recognition result of a road shape in the last time (before $\Delta t$ sec.), thus to estimate a road shape when viewed form the position of the vehicle 1 after $\Delta t$ sec.

Namely, when it is assumed that an output signal of the speed sensor 3 is V(m/sec), and an output signal (steering angle) of the steering angle sensor 4 attached on the steering column is $\eta$ (rad), an amount of advance $\Delta Z$(m) and a rotational angle (yaw angle) $\Delta \theta$ (tad) of the vehicle 1 for $\Delta t$ seconds are estimated generally by the following equations:

$$Z = V \times \Delta t \qquad (7)$$

$$\Delta \theta = \Delta Z \times tan(\eta/rs) \times 1/wb \qquad (8)$$

where rs is a ratio of rotation between the steering wheel and the front wheel, and wb is a wheel base of the vehicle.

Accordingly, an approach is employed to move, in a direction on this side, by $\Delta Z$, a road shape detected in the last processing to further rotate the road shape in a direction opposite to rotation of the vehicle 1 by $\Delta \theta$, thereby making it possible to estimate the approximate position and shape of a road after $\Delta t$ seconds.

Figure 14:
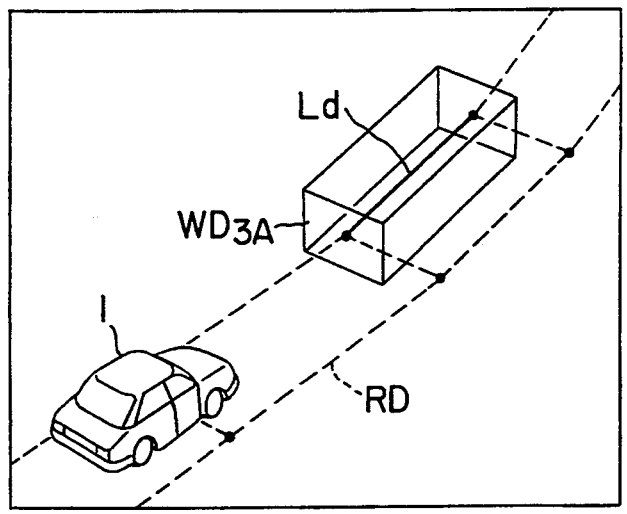
FIG. 14 is an explanatory view showing a shape of a three-dimensional window.
Figure 15:
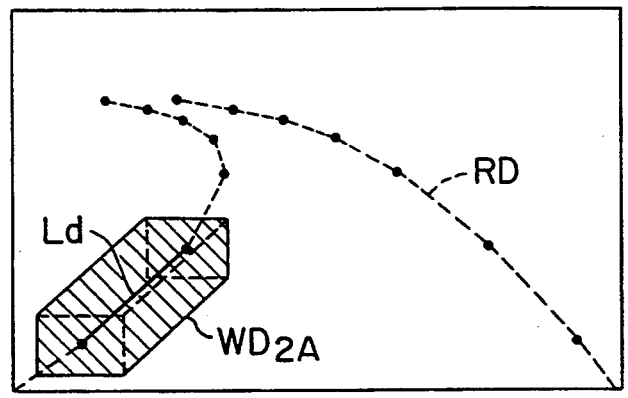
FIG. 15 is an explanatory view showing a shape of a two-dimensional window.

The three-dimensional window generating section 112 sets a first three-dimensional space area in a rectangular parallelopiped as shown in FIG. 14, i.e., a first three-dimensional window WD3A (hereinafter simply referred to as a three-dimensional window WD3A) with one linear element Ld within a range encompassed by left and right polygonal lines indicating an estimated road shape RD as a center to determine by calculation how the set three-dimensional window WD3A looks on a two-dimensional picture as shown in FIG. 15 to allow the area inside the window contour line (slanting line portions in FIG. 15) to be two-dimensional window WD2A to consider only data therewithin as data to be detected.

In order to obtain a two-dimensional window WD2A from the three-dimensional window WD3A, an approach is employed to calculate coordinates (in, jn) on a picture by using the previously described equations (5) and (6) from respective coordinates (Xn, Yn, Zn) of eight vertices of the three-dimensional window WD3A to calculate a polygon enveloping these points.

The three-dimensional window WD3A is such that the length is equal to the partitioning distance of respective sections (e.g., 10–17 m in front of the vehicle at the first section R1), and that the height and the width are changed in dependency upon circumstances such as a vehicle speed, etc. However, there may be an error in estimation of the road shape. For this reason, in the case where a discrepancy with respect to an actual position of the white line is expected, an approach is employed to increase the height and the width to broaden a detection range. However, if the window is caused to be too large, stones or trees and plants at the periphery of a road, etc. may be erroneously detected, constituting the cause of erroneous recognition. For this reason, it is important to suitably select the dimension of the window. In general express high-ways, it is already confirmed as the result of testing that changing the dimension in a range where the height is 0.4–0.8 m and the width is 0.4–1.6 m is proper.

As described above, even if a white line of a road and an three-dimensional object overlap with each other on a two-dimensional picture, an approach is employed to set a three-dimensional window to extract only data in the vicinity of the surface of a road, thereby making it possible to detect the white line in a manner to distinguish from the three-dimensional object. Further, although there exist stones, trees and plants at the periphery of a road, an approach is employed to set a three-dimensional window to extract only data in the vicinity of the position where white lines are estimated to be present, thereby making it possible to detect the white line on the road in a manner to distinguish from these stones or trees and plants, etc. In addition, a two-dimensional window is set, thereby making it possible to reduce a region to be searched and the amount of data to this shorten processing time.

The linear element detecting section 113 calculates an amount $\Delta X$ of discrepancy in an X-direction and an amount $\Delta Y$ of discrepancy in a Y-direction of three-dimensional positions of an object with respect to the linear element Ld of the road shape previously estimated to multiply respective data by weighting coefficients set in dependency upon these amounts of discrepancy $\Delta X$, $\Delta Y$ to derive linear expressions in a horizontal direction (XZ-plane) and in a vertical direction (YZ-plane) by the least square, thus to obtain parameters.

More particularly, pixels within the two-dimensional window 2A are surveyed in succession to calculate three-dimensional positions (X, Y, Z) of an object by using the previously described equations (3) and (4) with respect to pixels having distance data to exclude, from data to be detected, distance data where the value of the distance Z is outside a range of length-of the three-dimensional window WD3A (e.g., Z=10–17 m in the first section R1).

Namely, since a picture of an object present on the opposite side or on this side of the three-dimensional window WD3A is imaged within the two-dimensional window WD2A, it cannot be said that an object surveyed within the two-dimensional window WD2A is included within the three-dimensional window WD3A. In view of this, an approach is employed to calculate three-dimensional positions (X, Y, Z) of an object of respective pixels to discriminate whether or not those positions are included within the three-dimensional window WD3A.

Figure 16:
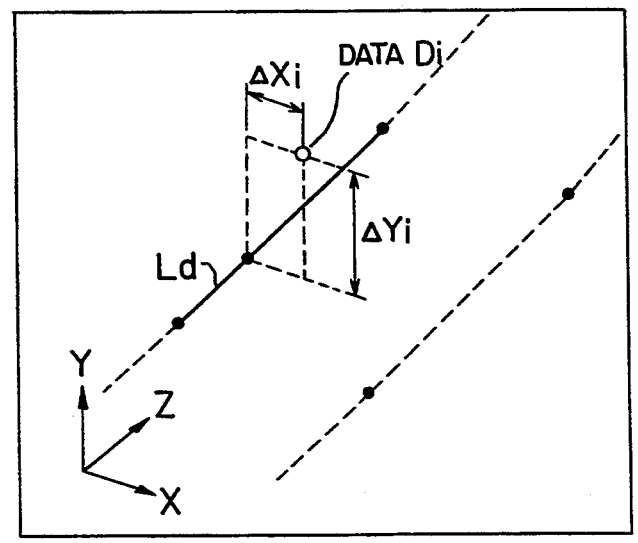
FIG. 16 is an explanatory view showing a linear element and an amount of discrepancy.
Figure 17:
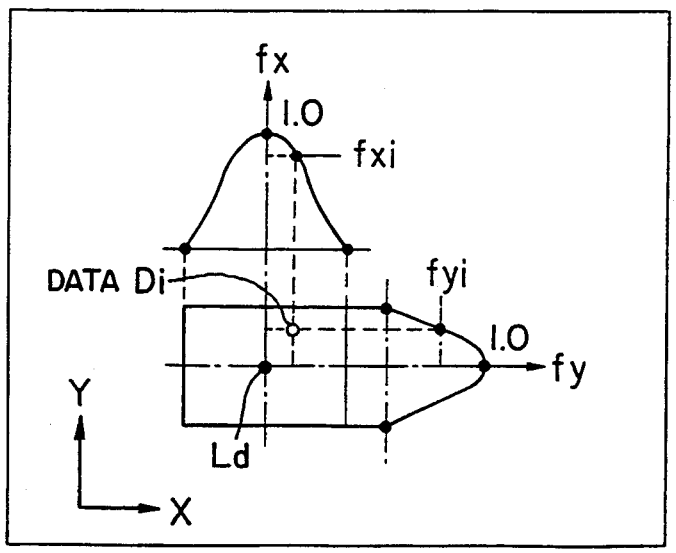
FIG. 17 is an explanatory view showing the relationship between an amount of discrepancy of data and weighting coefficients.

Subsequently, the previously estimated linear element Ld of the road shape and three-dimensional positions of the object are compared with each other to calculate amounts $\Delta Xi$, $\Delta Yi$ of discrepancy in the X-direction and in the Y-direction of data Di as shown in FIG. 16 to select only data within the range of the three-dimensional window WD3A having a predetermined width and height and thereafter to determine weighting coefficients of data Di corresponding to the amounts $\Delta Xi$, $\Delta Yi$ of discrepancy in the X-direction and in the Y-direction.

The weighting coefficient is shown in a graph form of a parabola where, the center is set to 1.0 and the periphery is set to 0.0, and wherein the product of a weighting coefficient fx in the X-direction and a weighting coefficient fy in the Y-direction is caused to be a weighting coefficient of that data Di. The ranges in the X-direction and in the Y-direction where the weighting coefficient is above 0.0 are set to the same values as those of the width and the height of the three-dimensional window 3A, or are set to values greater than those values.

After respective data Di are multiplied by the above-mentioned weighting coefficients, linear expressions in a horizontal direction and in a vertical direction indicated by the following equations (9), (10) are derived to obtain parameters a, b, c, d to consider these parameters as a candidate of a new linear element Ld:

$$\text{Horizontal direction: } X = a \times Z + b \tag{9}$$

$$\text{Vertical direction: } Y = c \times Z + d \tag{10}$$

At the same time, with respect to data where the weighting coefficient is above a set value (e.g., about 0.05–0.1), the number of data and the range of the distance Z where those data are distributed are examined. As a result, in the case where the number of data is less than a set value (e.g., about 10), or in the case where the range of distance Z is a value less than one half of the length of the three-dimensional window WD3A (e.g., the length of 7 m of Z=10–17 m in the first section R1), it is judged that a candidate of a correct linear element Ld cannot be obtained and to reject the linear expression obtained as above to judge that no candidate exists.

The above-mentioned processing is carried out in succession from the left and right sides and one side toward sections on a remote side, thus to obtain condidates of all linear elements Ld constituting a road model. At this time, there are instances where if the width of the three-dimensional window is set to too large a value, stones or trees and plants at the periphery of a road may fall within the edge of the three-dimensional window. However, in this linear element detecting section 113, a measure is taken to multiply respective data by weighting coefficients to allow the weight at the peripheral portion of the three-dimensional window to be small. Thus, even in the case where stones or trees and plants fall within the three-dimensional window, the influence resulting therefrom is effectively reduced so that a linear expression of a white line can be stably derived.

The road shape judgment section 114 judges reasonableness from parallelism in the horizontal direction and in the vertical direction with respect to candidates of both linear elements Ld on the left and right sides in connection with respective sections. In the case where the road shape judgment section 114 has judged those candidates to be reasonable as the result of judgment, this section 114 adopts both as a candidate of a new linear element Ld. On the other hand, when the judgment section 114 has judged that any one of the candidates of left and right linear elements Ld is not correct, it carries out substitution or supplementation (compensation). Then, the judgment section 114 outputs parameters of respective linear elements Ld thus obtained to the road/three-dimensional parameter memory section 130.

In actual terms, parallelism in the horizontal direction is examined from a difference between a parameter (hereinafter an indication is employed such that L indicating the left side and R indicating the right side are added to respective parameters) aL of the equation (9) with respect to the linear element Ld on the left side and a parameter aR of the equation (9) with respect to the linear element Ld on the right side. As a result, in the case where the parallelism is above a set value (e.g., about 5 degrees), the judgment section 114 judges that any one of left and right linear elements Ld is not correct. Similarly, the judgment section 114 examines parallelism in a vertical direction from a difference between a parameter cR and a parameter cL to judge that any one of the linear element is not correct in the case where the parallelism is above a set value (e.g., about 1 degree).

In the case where both parallelism in the horizontal and vertical directions satisfy the condition as the result of judgment, both parallelisms are adopted as a new linear elements. However, if any one of linear elements Ld is judged to be incorrect, the judgment section 114 compares candidates of respective left and right linear elements Ld and the position of a previously estimated road shape to adopt a candidate having a smaller amount of discrepancy as a new linear element Ld, and to reject the other and to consider that there is no candidate for the linear element.

In the case where any one of left and right linear elements Ld is judged to have no candidate as the result of judgment, in the case where data is lacking because the white line on a road is in a broken form, or goes out of sight behind the obstacles, so that any one of left and right linear elements Ld is judged to have no candidate, a linear element Ld on a detected side is subjected to parallel displacement, and is substituted for the linear element judged to have no candidate. Further, in the case where the both left and right linear elements Ld have no candidate, a linear element Ld of the previously estimated road shape is substituted. Thus, even if failure of detection and/or an erroneous detection of the linear element may partially take place, a stable road shape can be obtained as a whole.

Figure 18:
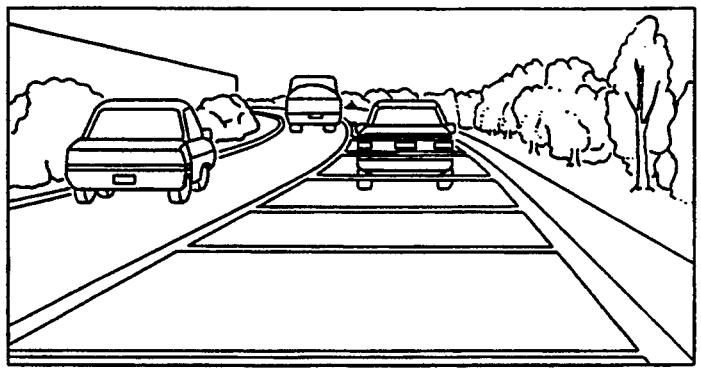
FIG. 18 is an explanatory view showing an example of a road shape detected by the system.

FIG. 18 is an explanatory view where the road shape detected by the road detecting section 110 is diagramatically indicated. As seen from this figure, linear elements are detected along left and right white lines. The portion which goes out of sight behind a vehicle running foward is satisfactorily estimated by carrying out supplement or compensation as described above. It is to be noted that lateral lines between left and right linear elements are the boundary between respective sections.

Respective functions of the object detecting section 121, the three-dimensional window generating section 122 and the object contour image extraction section 123 in the object recognition section 120 will now be described in detail.

The object detecting section 121 divides a distance picture from the stereoscopic picture processing apparatus 20 every predetermined interval (e.g., interval of 8–20 pixels) in a lattice form to select only data of three-dimensional objects which may constitute an obstacle to running for every respective regions to calculate that detection distance.

Figure 19:
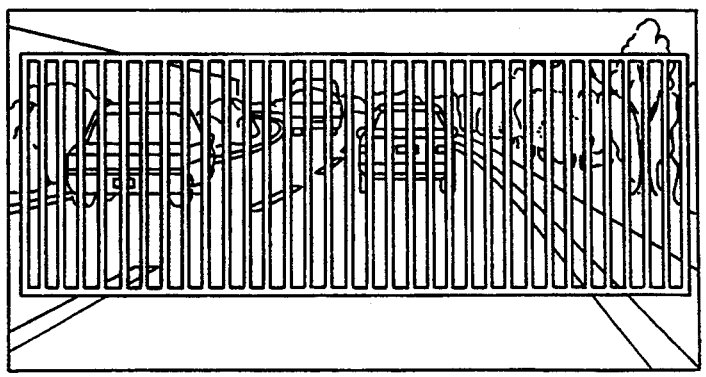
FIG. 19 is an explanatory view showing a method of dividing a picture in the system.

FIG. 19 is an explanatory view wherein a region in a lattice form is provided on a picture having a predetermined brightness obtained by imaging a scene in front of the vehicle 1. In actuality, the distance picture of FIG. 9 is divided in such a manner. In this embodiment, the distance picture is divided into 33 small regions at an interval of 12 pixels. Namely, a picture is divided into a large number of regions to seek for objects, thereby making it possible to detect a plurality of objects at the same time.

An object in each region is calculated as follows. Namely, three-dimensional positions (X, Y, Z) of a real space are calculated by using the previously described equations (3) and (4) from coordinates (i, j) on a picture and distance data Z. Further, the height Yr from the road surface in the distance Z is calculated by using the equation (10) of the previously detected road shape. Namely, the height H from the road surface of an object can be calculated by using the following equation (11).

$$H = Y - Yr \qquad (11)$$

An object having a height less than about 0.1 m is assumed to be white line, stain or shadow on a road. Accordingly, such an object is considered not to be an object which constitutes an obstacle to driving. For this reason, data of such an object is rejected. Since an object having a height higher than that of the vehicle is also considered to be pedestrian bridges or signposts, etc., data corresponding thereto are rejected to select only data of a three-dimensional object which constitutes an obstacle on a road. Thus, even if an object is overlapping with a road, etc. on a two-dimensional picture, data is discriminated by the height from the road surface, thus making it possible to detect only an object.

Figure 20:
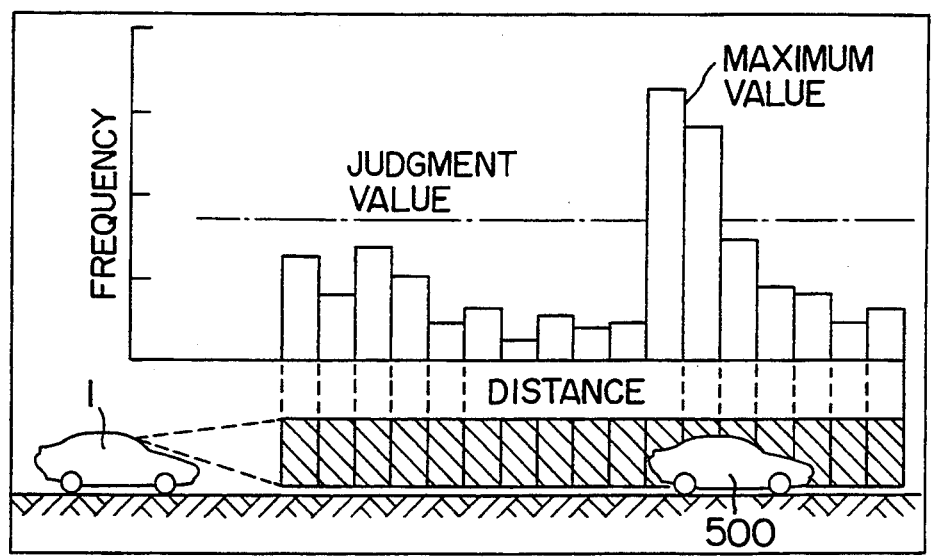
FIG. 20 is an explanatory view showing the relationship between an object to be detected and a histogram.

Then, the number of data included in the section of distance Z set in advance is counted with respect to data of a three-dimensional object extracted in this way, thus to prepare a histogram having distance Z as the abscissa. FIG. 20 is a histogram wherein a preceding vehicle 500 is taken as an object to be detected.

It is necessary to determine the length of the section and the number of sections of distance Z to be set in consideration of detection limit and accuracy of distance Z, and shape of an object to be detected. For example, in the case where driving on an express highway is taken, it is desirable that the section length in front of the vehicle by 10 m is about 1.5 m, and the section length in front of the vehicle by 100 m is about 15 m.

In the above-mentioned histogram, since values erroneously detected exist in distance data in a inputted distance picture, data appear somewhat at the position where no object exist in actuality. However, if an object of a dimension to some extent is present, the frequency at that position indicates a large value. On the other hand, in the case where no object exists, the frequency occurring by only erroneous distance data becomes a small value.

Accordingly, if there is a section greater than a judgment value set in advance and taking a maximum value in the frequency of the prepared histogram, it is judged that an object exists in that section. On the contrary, in the case where the maximum value of the frequency is less than the judgment value, it is judged that no object exists. Thus, also in the case where noise is included to some extent in data of picture, it is possible to detect an object with the influence by noise being caused to be as minimum as possible.

When it is judged that an object exists, an average value of distance Z of data of a three-dimensional object included in a detected section and sections adjacent thereto before and after is calculated to consider this value as a distance up to the object.

Such processing for detecting distance up to the object is carried out with respect to the entire area thereafter to examine detection distances of the object in respective areas, whereby when a difference between detection distances up to the object in adjacent areas is less than a set value, they are considered to be the same object, while when that difference is above the set value, they are considered to be individual objects.

In actual terms, the left end area AR1 is first examined. As a result, in the case where an object is detected, it is assumed that the detected object and its distance are represented by S1 and Z1, respectively. Then, the area AR2 adjacent on the right side is examined. As a result, in the case where no object is detected, it is judged that the object S1 exists within the area AR1 and in the vicinity thereof, and the distance thereof is represented by Z1. In contrast, in the case where an object is detected and its detection distance is represented by Z2, a difference between the distances Z1 and Z2 is examined.

In the case where a difference between the distances Z1 and Z2 is above a set value, it is judged that an object in the area AR2 is different from the previously detected object S1. It is now assumed that that object and the distance thereof are respectively represented by S2 and Z2 to examine areas further adjacent to the area AR2.

On the other hand, in the case where a difference between distances Z1 and Z2 is less than a set value, the object detected in the area AR2 is judged to be the previously detected object S1, and its distance is assumed as an average value of the distances Z1 and Z2 to examine areas further adjacent thereto in succession. As a result, if it is judged that the objects S1 are continuously present, the distance and the existing area are updated.

Hitherto, in the case where there is a remote background of an object on a two-dimensional picture, it was difficult to extract only data of that object. To the contrary, in accordance with this invention, processing as described above is carried out from the left end area AR1 up to the right end area AR33 to discriminate data by values of distance, thereby making it possible to detect a plurality of objects, distances thereof and their existing areas in a manner to distinguish them from the background. In addition, also in the case where there are a plurality of objects on a two-dimensional picture in an overlapping manner, it is possible to detect them in a manner to distinguish therebetween by differences between distances of respective obstacles.

It is to be noted that it is empirically confirmed that the above-mentioned set value is about 4–6 m in the case of detecting an automobile, and is about 1–2 m in the case of detecting a pedestrian.

Figure 21:
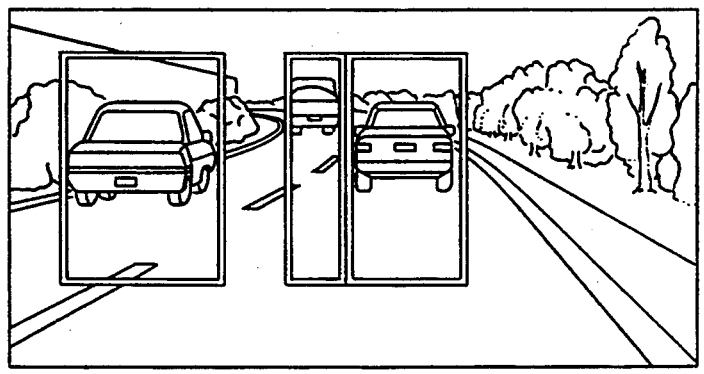
FIG. 21 is an explanatory view showing a detected result of the area where an object exists and a detected distance.

FIG. 21 shows existing areas of objects detected by the above-mentioned processing by frame lines. In this example, three objects are detected. It is to be noted that numeric values on the lower side of the figure are detection distances of respective objects.

Figure 22:
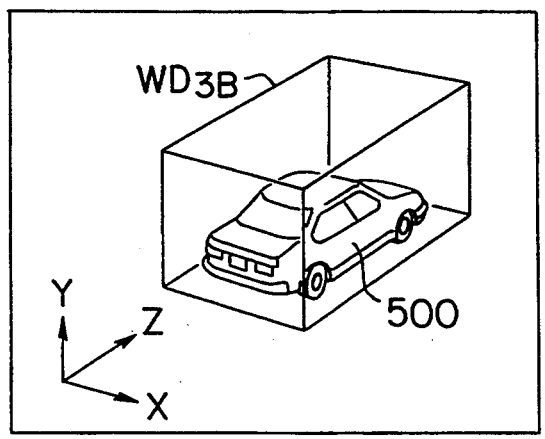
FIG. 22 is an explanatory view showing a shape of a three-dimensional window.

The three-dimensional window generating section 122 sets a second three-dimensional space area of rectangular parallelopiped, i.e., a second three-dimensional window WD3B (hereinafter simply referred to as a three-dimensional window WD3B) including a detection object (proceeding vehicle) 500 in a three-dimensional space as shown in FIG. 22 with respect to respective objects detected by the object detection section 121 to determine by calculation how the three-dimensional window thus set appears on a two-dimensional picture to allow only data within the two-dimensional window WD2B defined by the window contour lines to be data to be detected.

The lateral width of the object detecting three-dimensional window WD3B is set to a range extended by one area in left and right directions with respect to the existing area of an object. The reason why such a range is adopted is as follows. Namely, in the case where only one portion of the left or right end of an object fall within a certain area, that object does not take a large value on the histogram, resulting in the possibility that another object may be detected. For this reason, the range of the window is extended in consideration of such a case.

The length in a direction of distance Z of the three-dimensional window WD3B is set to a range obtained by adding a section length of the histogram in the detection distance of that object to detection distances before and after that section length. The lower end of the three-dimensional window WD3B is set to a position obtained by adding about 0.1 m to the height from the road surface, and the upper end thereof is set as the upper ends in respective areas divided for detection of an object.

It is to be noted that the processing for obtaining the object detecting two-dimensional window WD2B from the object detecting three-dimensional window WD3B is the same as the processing which has been already described in the three-dimensional window generating section 112 of the road detecting section 110.

Figure 23:
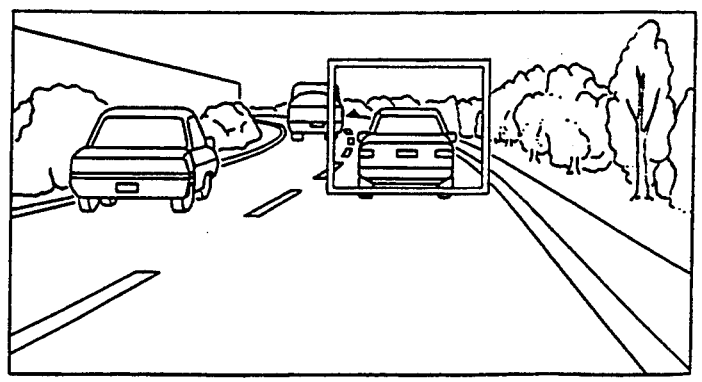
FIG. 23 is an explanatory view showing a shape of a two-dimensional window.

FIG. 23 shows an example where a two-dimensional window WD2B is set with respect to one of three detection objects already shown in FIG. 21.

The object contour image extraction section 123 carries out a processing to survey in succession respective data within the two-dimensional window WD2B to select only data included within the three-dimensional window WD3B to extract a contour image of a detected object to detect amounts of positional relationship with respect to the automobile concerned such as position, speed or acceleration, etc. of an object to be detected, and to judge danger of collision.

Namely, respective data within the two-dimensional window WD2B are surveyed in succession for every object to calculate three-dimensional positions (X, Y, Z) by using the previously described equations (3) and (4) with respect to pixels having pixel data thereafter to extract only data where the value of the distance or the height is within the range of the three-dimensional window WD3B, and to reject other data.

Figure 24:
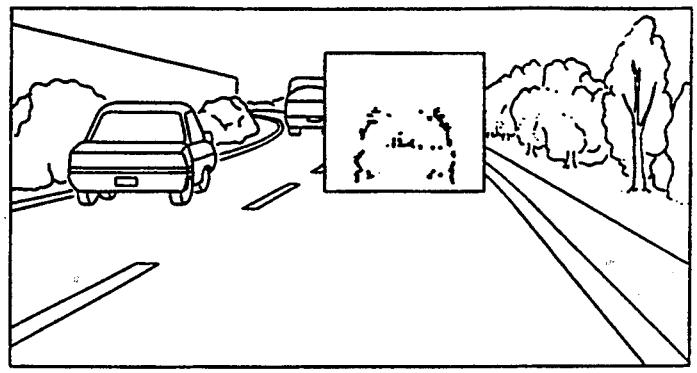
FIG. 24 is an explanatory view showing data constituting a contour of an object.
Figure 25:
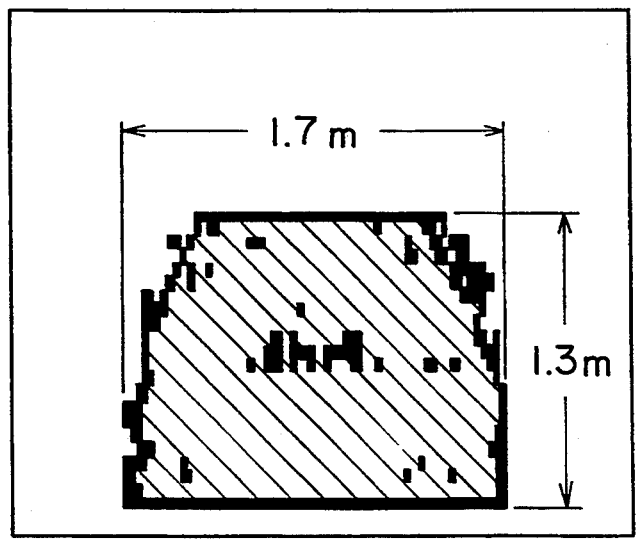
FIG. 25 is an explanatory view showing an example of a contour image of an object and a detected outside dimension in the system.

When data extracted in this way are projected onto a two-dimensional picture and are displayed, a picture as shown in FIG. 24 is provided. Further, when the outside portions of these data are connected by line segments, a contour image of an object as shown in FIG. 25 is provided. When coordinates (i, j) on a picture at the left and right ends and upper end of this contour image are detected thereafter to calculate positions of the left and right ends and the upper end in a three-dimensional space by using the detection distance Z of that object and the equations (3) and (4), the lateral width of the object is determined from positions of the left and right ends, and the height of the object is determined from the position of the upper end. In FIG. 25, this object can be discriminated as an object having a width of 1.7 m and a height of 1.3 m.

Further, the central positions (X, Z) of the left and right ends of the object are calculated. A relative speed in forward and backward directions of the object when viewed from a corresponding vehicle (vehicle 1) is calculated. Further, a relative speed in left and right directions is calculated from a change in time in left and right directions of the position X. In addition, when the relative speed of the object is added to a running speed of the corresponding vehicle inputted from the speed sensor 3, a running speed of the object relative to the road surface is calculated. Accelerations of respective objects are calculated from changes in time of the running speed.

Subsequently, positions of respective detected objects and positions of lanes of a detected road are compared with each other to examine whether that object exist on a corresponding lane, on lanes on left and right sides, or in an area except for the road to make sorting with respect to each case. For example, in the case where a plurality of vehicles run forward of the corresponding vehicle and the road is curved, positions of respective objects are compared along that route. Thus, an object existing foremost on the corresponding lane is judged as a preceding vehicle, and a distance up to that object is assumed as a distance between vehicles.

Then, an approach is employed to estimate positions in several seconds of respective objects from detected positions, and running speeds and accelerations in forward and backward directions and in left and right directions of respective objects, and to estimate positions in several seconds on the assumption that a corresponding vehicle runs in accordance with a lane of a detected road or a current steering angle to thereby compare respective positions of respective objects and the corresponding vehicle to the possibility of collision therebetween.

Parameters such as position, shape, speed and acceleration of respective objects, and the possibility of collision, etc. determined as stated above are outputted to the road/three-dimensional parameter memory section 130, and are stored thereinto.

The calculation of distance information by the stereoscopic picture processing apparatus 20 and the operation of the road/three-dimensional detecting apparatus 40 will now be described.

Figure 26:
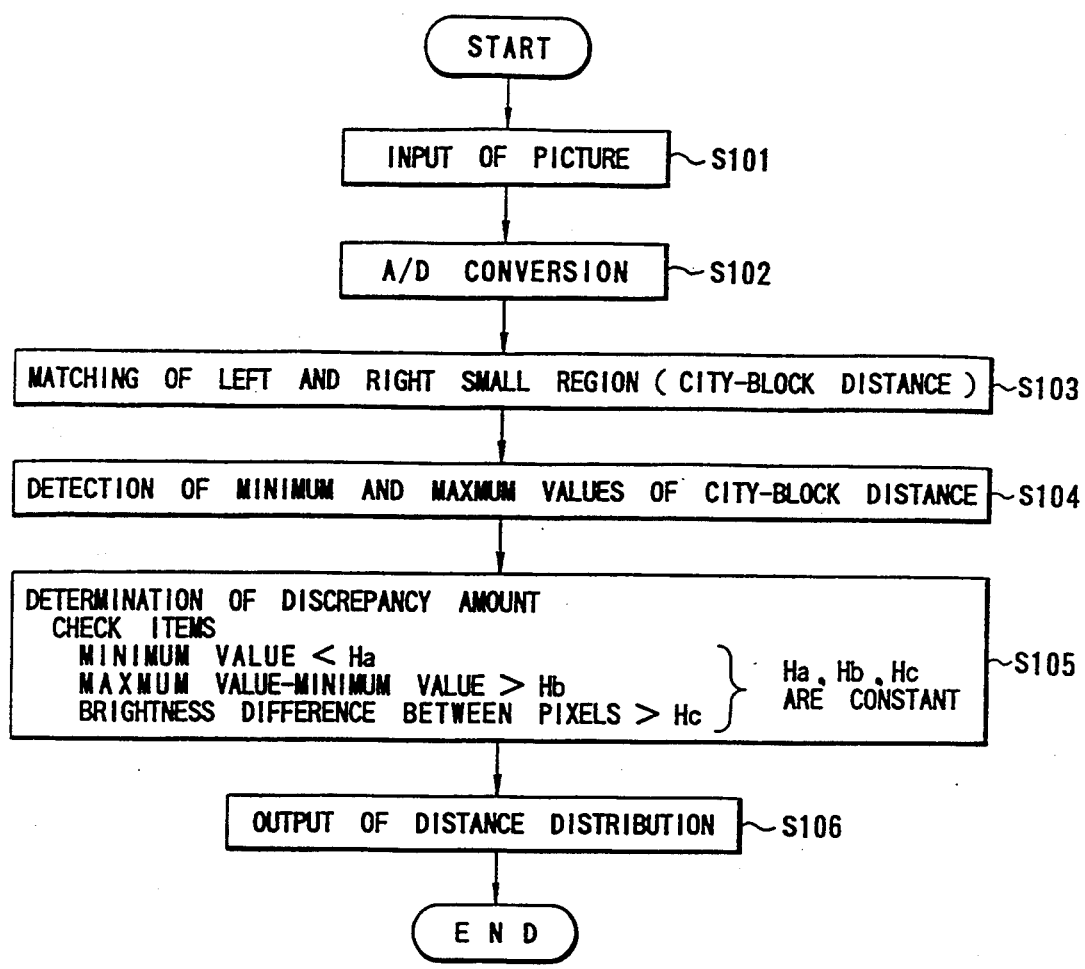
FIG. 26 is a flowchart showing the operation of a stereoscopic picture processing apparatus.

The operation of the stereoscopic picture processing apparatus 20 will be first described with reference to the flowchart shown in FIG. 26. When pictures taken by the CCD cameras 11a and 11b are inputted in step S101, the processing apparatus 20 carries out A/D conversion of the input pictures in step S102 to correct such digital picture data by the LUT 32a and 32b, and thereafter to store them into the picture memories 33a and 33b.

The pictures which are stored in the picture memories 33a and 33b are only the scanning lines required for subsequent processing of all the scanning lines of the CCD device of the CCD cameras 11a and 11b. For example, these picture data are rewritten, e.g., at the rate of one every 0.1 second (at the rate of one every three television frames).

Next, when the processing procedure proceeds to step S103, the left and right picture data are read in, e.g., four lines at a time from the left and right picture memories 33a and 33b via the shared bus 80 and to the input buffer memories 41a, 41b, 42a and 42b, matching of the read left and right pictures is performed as an evaluation of the coincidence.

In this instance for, every left and right picture, a read operation from the picture memories 33a and 33b to the input buffer memories 41a, 41b, 42a and 42b and a write operation into the shift registers 43a, 43b, 44a and 44b are performed alternately.

For example, with respect to a left picture, while the picture data is being read from the picture memory 33a into one of the input buffer memories 41a, a write operation of the picture data which has been read is performed from the other input buffer memory 41b to the shift register 43b. On the other hand, with respect to a right picture, while picture data is being read from the picture memory 33b into one input buffer memories 42a, a write operation of the picture data which has been read is performed from the other input buffer memory 42b to the shift register 44b.

Figure 27:
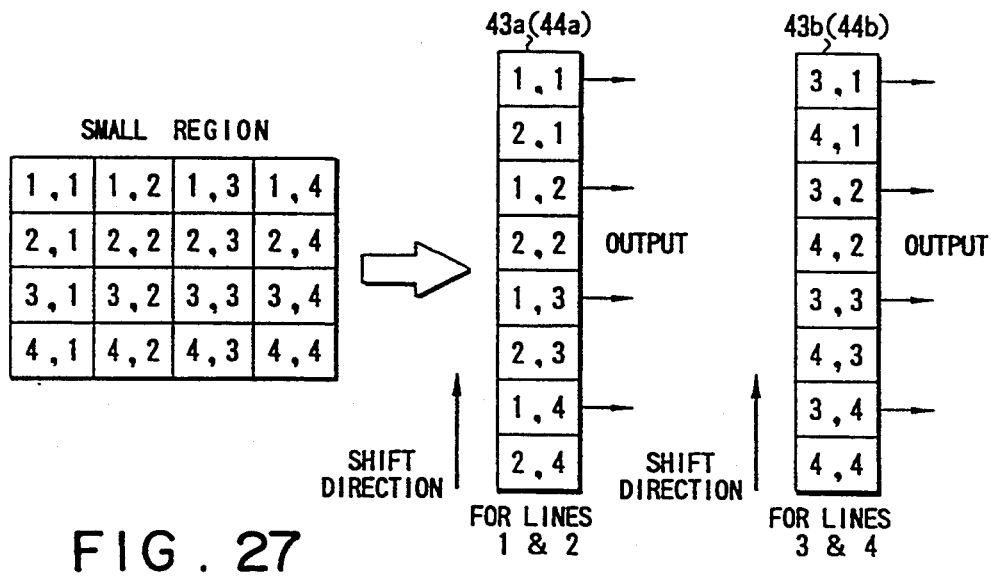
FIG. 27 is an explanatory view showing the order of storage in a shift register.

Then, as shown in FIG. 27, picture data (1, 1) ... (4, 4) in the small region of 4×4 pixels for left and right pictures are held in the shift registers 43a, 43b, 44a and 44b. Data for the first and second lines are held in one of the shift register 43a (44a) and data for the third and second lines are held in the other shift register 43b (44b) in order of odd lines and for even lines every pixel, respectively.

The shift registers 43a, 43b, 44a and 44b respectively have independent transfer lines, and data of 4×4 pixels is transferred, in eight clocks. Then, these shift registers 43a, 43b, 44a and 44b simultaneously output the contents of the even stages of the eight stages to the city-block distance calculation circuit 45. When the calculation of the city-block distance H starts, the data of the right picture is held in the shift register 44a and 44b, and data of odd-numbered lines and even-numbered lines are alternately outputted every clock. On the other hand, data of the left picture continues to be transferred to shift registers 43a, 43b, data are replaced by data shifted to the right by one pixel every two clocks while data of odd-numbered lines and even-numbered lines are alternately output. This operation is repeated until data are shifted, e.g., by 100 pixels (200 clocks).

When transfer with respect to one small region is completed, the content of the right picture address counter (leading address in the next small region of 4×4 pixels) is set at the left picture address counter in the #2 address controller 87. Thus, the processing for the next small region is started.

Figure 28:
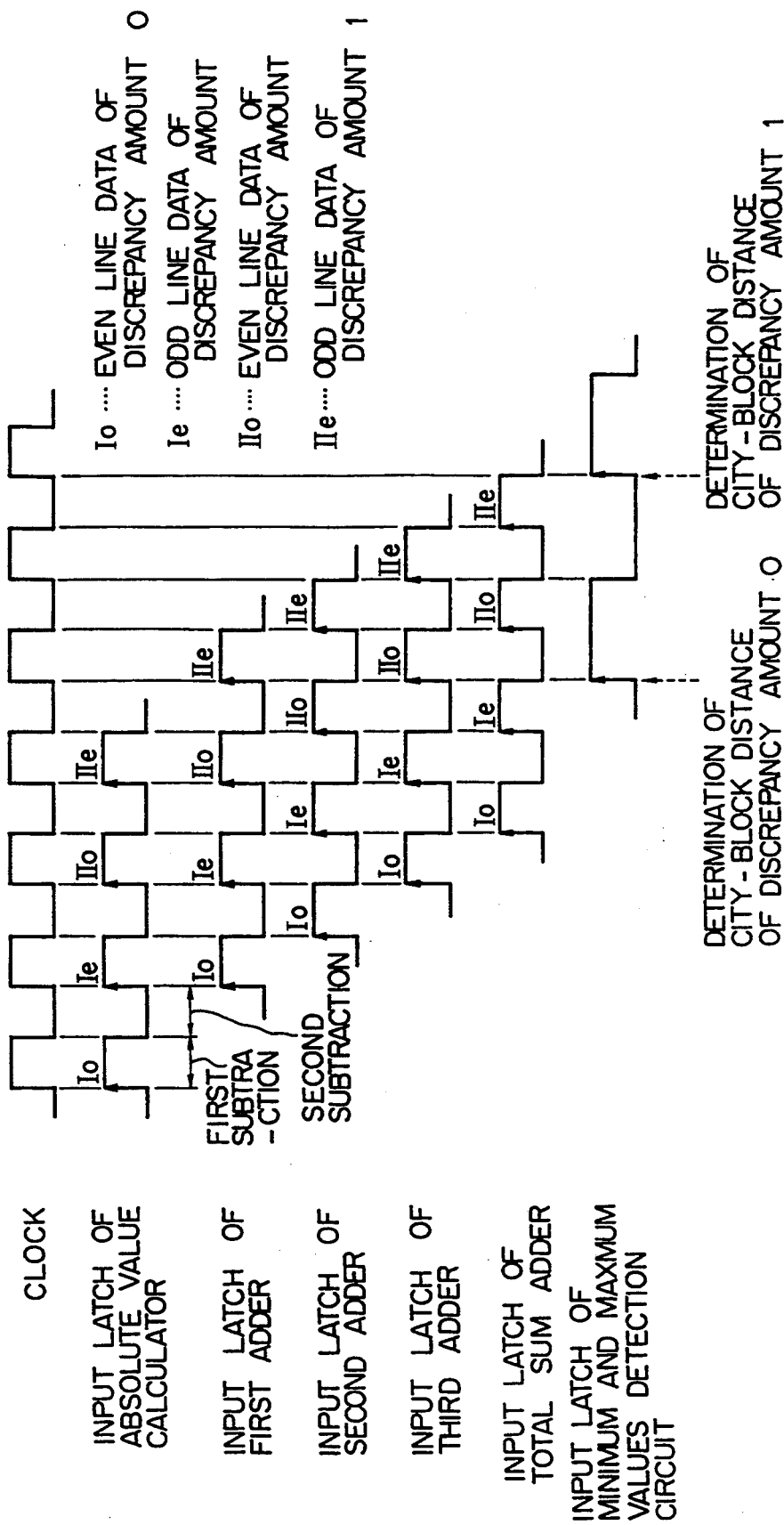
FIG. 28 is a timing chart showing the operation of a city block distance calculation circuit.

In the city-block distance calculation circuit 45, as shown in timing chart of FIG. 28, the data of 8 pixels is first input to the absolute value calculator of the first stage of the pyramid structure. Thus absolute value of a difference between the left and right pictures is calculated. More specifically, there is adopted a method of subtracting, from the brightness of the right pixel, the brightness of left pixel corresponding thereto, whereby when the result is negative, the calculation command is changed to again perform subtraction with the subtrahend as the side and the subtracted side being reversed to thereby perform calculation of the absolute value. Accordingly, there are instances where subtraction is performed twice at the first stage.

After this, when the initial stage is passed, the first through third adders from the second through fourth stages add the two input data which have been input at the same time and output the added result. Then, a sum total is calculated by adding two continuous data at the final stage to output the necessary city-block distance H of 16 pixels to the minimum and maximum value detection section 50 every two clocks.

Then, the processing procedure proceeds to step ST104 to detect a maximum value $H_{MAX}$ and a minimum value $H_{MIN}$ of the city-block distance H calculated in step S3. As has been described, the detection of the maximum value $H_{MAX}$ and the minimum value $H_{MIN}$ are exactly the same except that the logic in the former case and that in the latter case are opposite to each other, and that the discrepancy amount is not retained. Accordingly, the detection of the minimum value $H_{MIN}$ will be described below as a representative example.

First, the city-block distance H initially output (the discrepancy amount δ is "0") is input to the B-register 46b of the calculator 46 via the C-latch 53 of the minimum value detection circuit 51 shown in FIG. 7. The city-block distance H (for which the discrepancy amount is 1) output at the next clock is input to the C-latch 53 and to the A-register 46a of the calculator 46. Thus, the calculator 46 starts a calculation of comparison with the B-register 46b at the same time.

If the result of the comparison calculation in the calculator 46 shows that the content of the A-register 46a is smaller than the content of the B-register 46b, the content of the C-latch 53 (that is, the content of the A-register 46a) is sent to the B-register 46b and the discrepancy amount x at this time is retained in the D-latch 55. By this clock, the city-block distance H (the discrepancy amount δ is 2) is inputted to the A-register 46a and the C-latch 53 at the same time. Thus, the comparison calculation is started again.

In this manner, a calculation is continued until the discrepancy amount becomes equal to 100 while the minimum value in the middle of calculation is always stored in the B-register 46b and the discrepancy amount at that time is retained in the D-latch 55. When the calculation is completed, (after one clock from the time point when the final city-block distance H is output), the contents of the B-register 46b and the D-latch 55 are read into the discrepancy amount determination section 60.

During this time period, an initial value in the next small region is read into the city-block distance calculation circuit 45, so that time is not wastefully spent. It takes, e.g. 4 clocks for calculating one city-block distance H. Since there is adopted a pipeline structure in this invention, a new calculation result is obtained every two clocks.

In step S105, when the minimum value $H_{MIN}$ and the maximum value $H_{MAX}$ of the city-block distance H are determined in the step S105, the discrepancy amount determination section 60 checks the three conditions mentioned above. Thus, the discrepancy amount D is determined.

Figure 29:
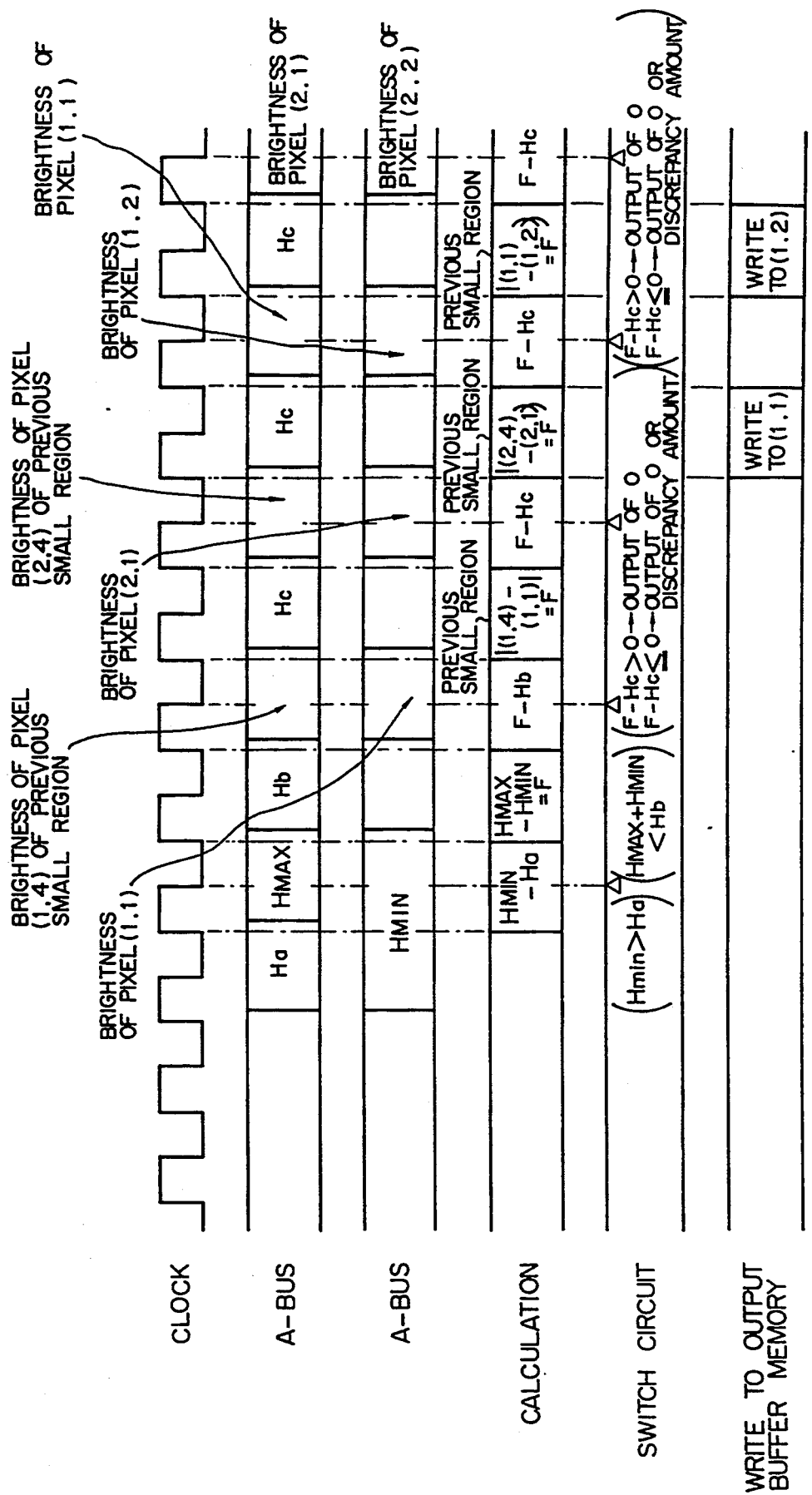
FIG. 29 is a timing chart showing the operation of a discrepancy amount determining section in the system.

More specifically, as shown in the timing chart of FIG. 29, the minimum value $H_{MIN}$ is latched into the B-register 72 of the calculator 61 via the B-bus 62b and the threshold value Ha which is compared with the value in the B-register 72 is latched into the A-register 71 via the A-bus 62a. The minimum value $H_{MIN}$ and the threshold value Ha are compared in the ALU 70. As a result, if the minimum value $H_{MIN}$ is larger than the threshold value Ha, the switch circuit 65 is reset, and 0 is output irrespective of the results of the checking operations conducted later.

The maximum value $H_{MAX}$ is then latched into the A-register 71, and a difference between the maximum value $H_{MAX}$ latched in the register 71 and the minimum value $H_{MIN}$ retained in the B-register 72 is calculated. The result thus obtained is output to the F-register 73. By the next clock, the threshold value Hb is latched into the A-register 71, and is compared with the value of the F-register 73. As a result, if the content of the F-register 73 is smaller than the threshold value Hb latched in the A-register 71, the switch circuit 65 is similarly reset.

The calculation of the brightness difference between adjacent pixels starts from the timing of the next clock. A pair of shift registers 64a and 64b adapted to preserve the brightness data therein have a ten-stage configuration, and are connected to the subsequent stage of the shift registers 44a for the first and second lines of the city-block distance calculation section 40 and the shift registers 44b for the second and third lines thereof. Respective output of these shift registers 64a, 64b are taken out from the final stage and the stage proceeding thereto by too. These output thus obtained are output to the A-bus 62a and the B-bus 62b.

At the stage where the calculation of the brightness difference starts, brightness at respective locations in the small region are retained in respective stages of the shift registers 64a and 64b. First, the last brightness data of the fourth row and the first column in the small region and the current brightness data of the first row and the first column in the small region are latched into the A-register 71 and the B-register 72 of the calculator 61.

Then, an absolute value of a difference between the content of the A-register 71 and the content of the B-register 72 is calculated and the calculated result is stored into the F-register 73. The threshold value Hc is then latched into the A-register 71 by the next clock, and is compared with the value of the F-register 73.

If the comparison results of the calculator 61 indicate that the content of the F-register 73 (absolute value of the brightness difference) is larger than the content of the A-register (threshold value Hc), then switch circuit 65 outputs either the discrepancy amount δ or "0". In contrast, if the content of the F-register 73 is smaller than the content of the A-register, "0" is output and is written into a memory area of the first row and the first column of corresponding small regions of the output buffer memories 66a and 66b.

While the comparison between the threshold value Hc and the brightness difference between adjacent pixels is being performed in the calculator 61, the shift registers 64a and 64b are shifted by one stage. Then, a calculation is started in turn with respect to the last brightness data of the fourth row and the second column of the small region and current brightness data of the first row and the second column in the current small region. In this manner, calculation is performed with respect to the first column and the second column of the small region one after another, and calculation is performed with respect to the the third column and the fourth column of the small region.

During such calculation, the final stage and the initial stage of the shift registers 64a and 64b are connected to constitute a ring type shift register. When a shift clock is added twice after calculation of the entire small region is completed, the content of the register returns to the state where it does not undergo such calculation. When transfer of the brightness data of the next small region is completed, data of the four rows of the current small region ia stored into the final stage and the stage preceding thereto.

As stated above, since next data is prepared on the A-bus 62a, B bus 62b, or its result is written during calculation for determination of a discrepancy amount, one data is processed by two clocks necessary for calculation. As a result, all of the calculations are completed in 43 clocks for example, even when checking of the minimum value $H_{MIN}$ and the maximum value $H_{MAX}$ which are initially performed are included. Accordingly, there is sufficient margin for the time necessary to determine the minimum value $H_{MIN}$ and the maximum value $H_{MAX}$ of the city-block distance H with respect to a single small region. When needed, other functions may be supplemented.

When the discrepancy amount δ is determined, the discrepancy amount δ is output, in step S106, as distance distribution information from the output buffer memories 66a and 66b to the dual port memory 90. Thus, the processing in the stereoscopic picture processing apparatus 20 is completed.

These output buffer memories 66a and 66b have a capacity of four lines, for example, similar to the input buffer memories 41a, 41b, 42a and 42b. While data is written into one set of memories, distance distribution is sent out from the other set of memories.

The distance distribution information written into the dual port memory 90 enables the calculation of the three-dimensional position in the XYZ space of the object corresponding to respective pixels, from the optical system parameters such as the mounting position of the CCD cameras 11 and 12 and the focal length, and enables the accurate detection of the distance up to an object outside a vehicle without lowering of the amount of information.

Figure 30:
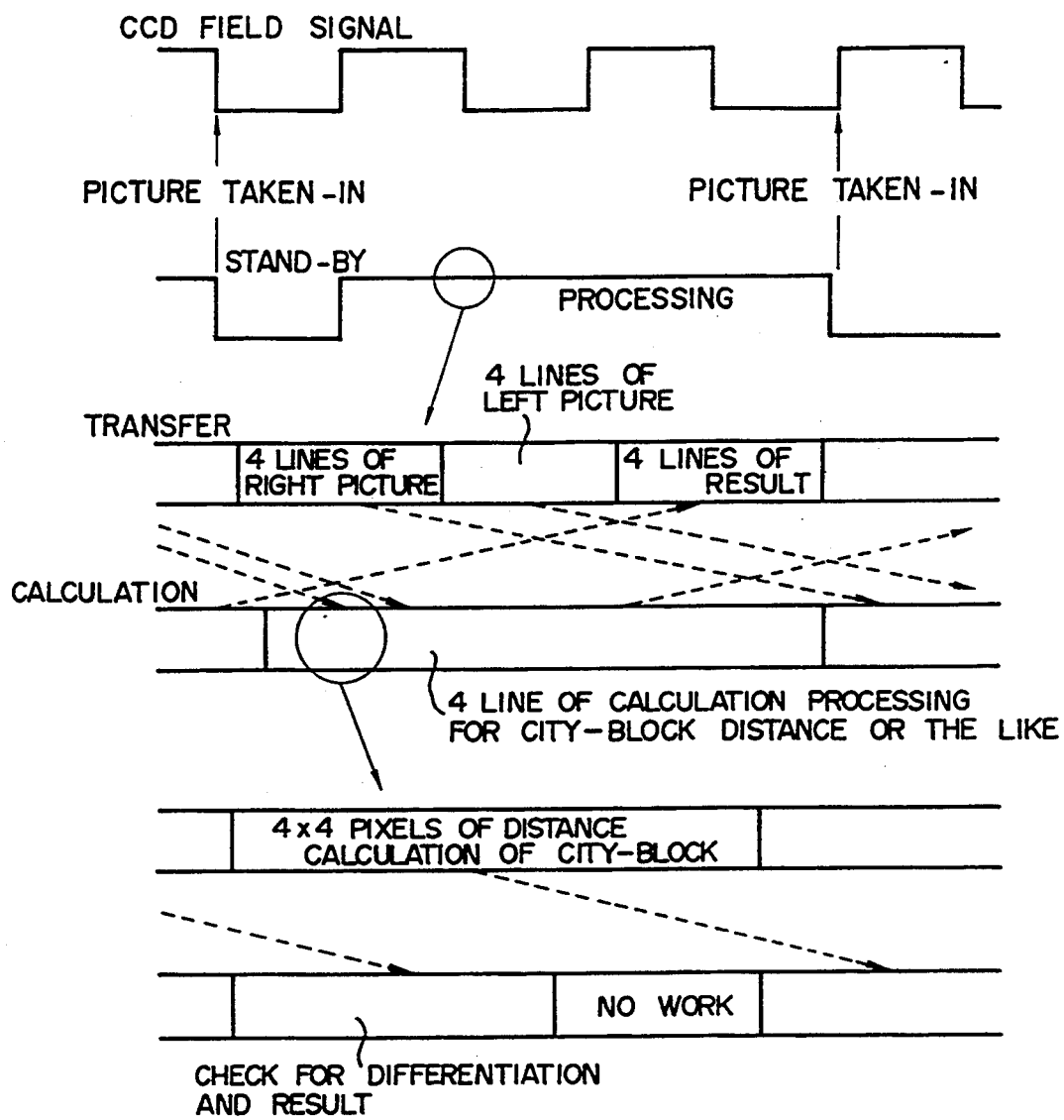
FIG. 30 is a timing chart showing the operation of a stereoscopic picture processing apparatus.
Figure 31:
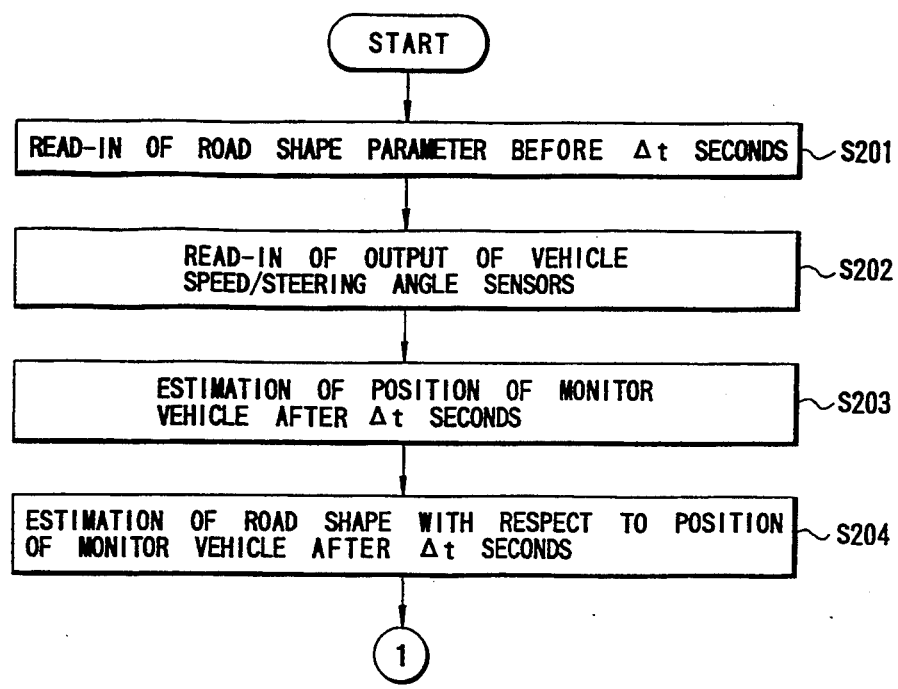
FIG. 31 is a flowchart showing a road shape estimation processing carried out by the road detecting section.
Figure 32:
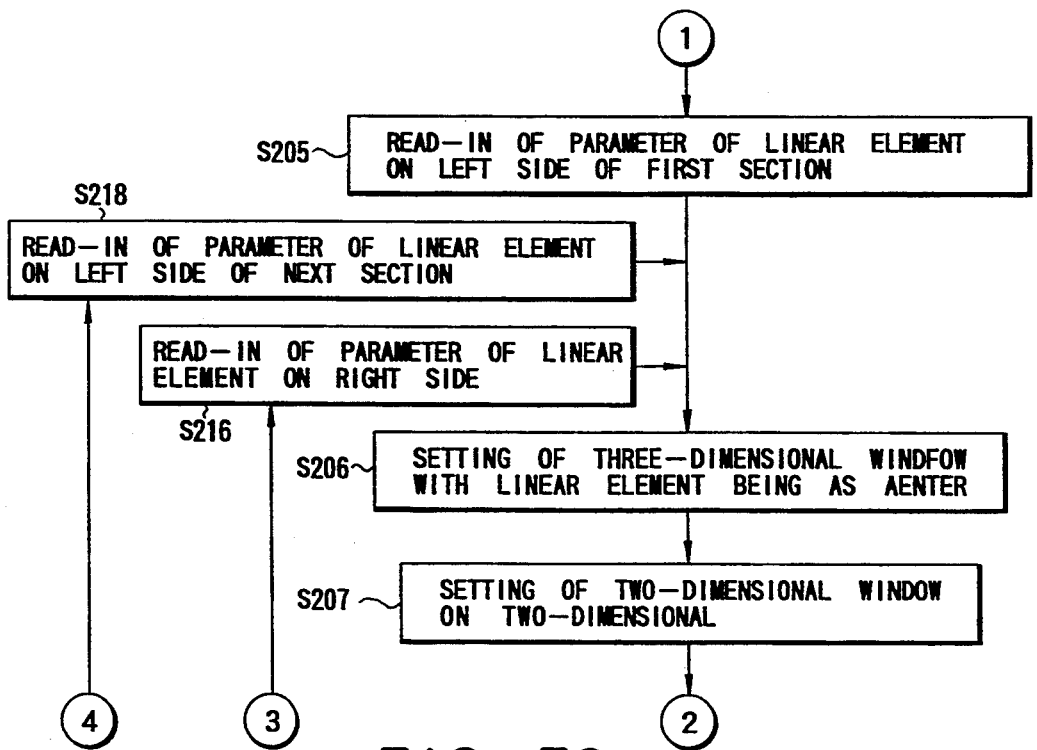
FIG. 32 is a flowchart showing a three-dimensional window generation processing carried out by the road detecting section.
Figure 33:
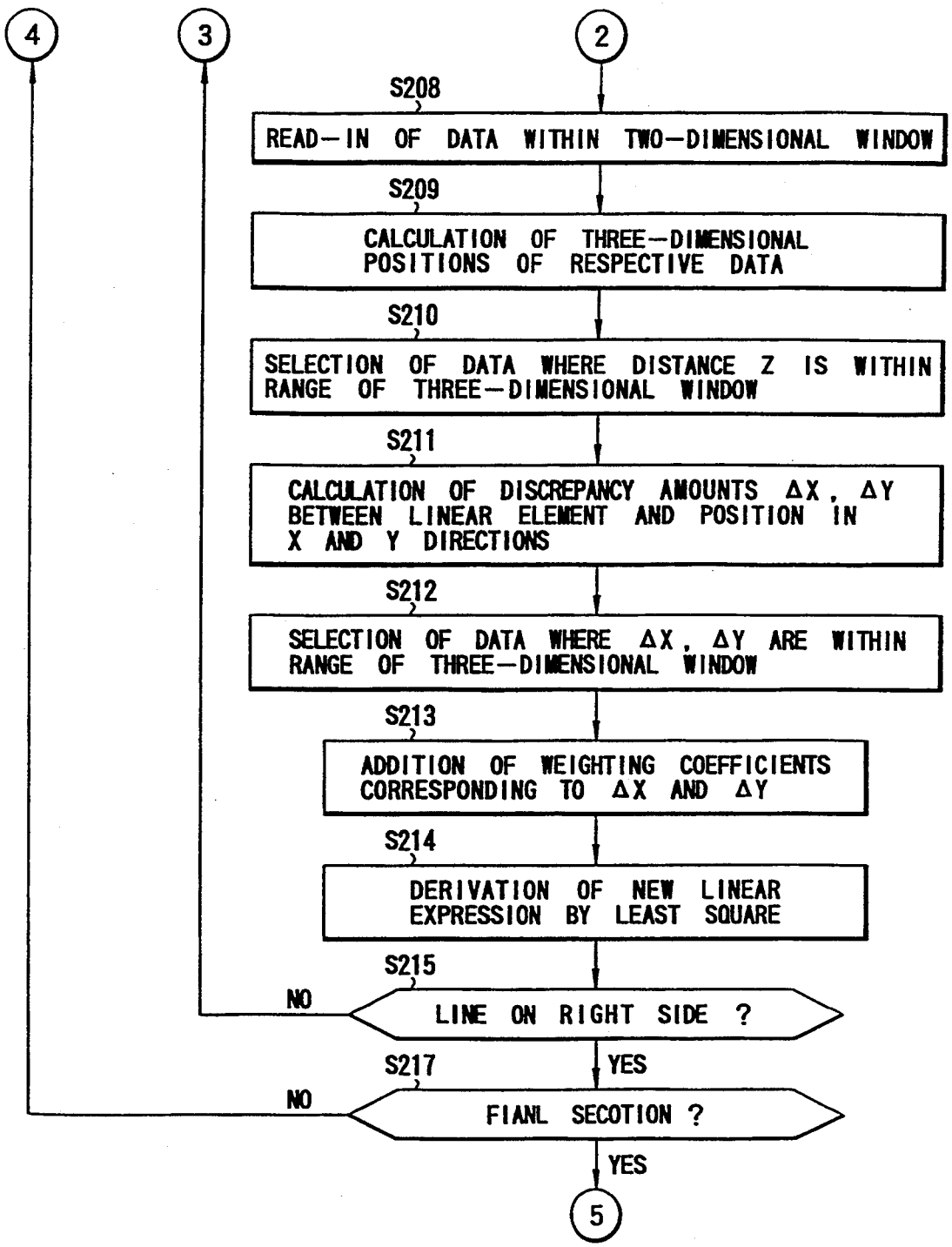
FIG. 33 is a flowchart showing a linear element detection processing carried out by the road detecting section.
Figure 34:
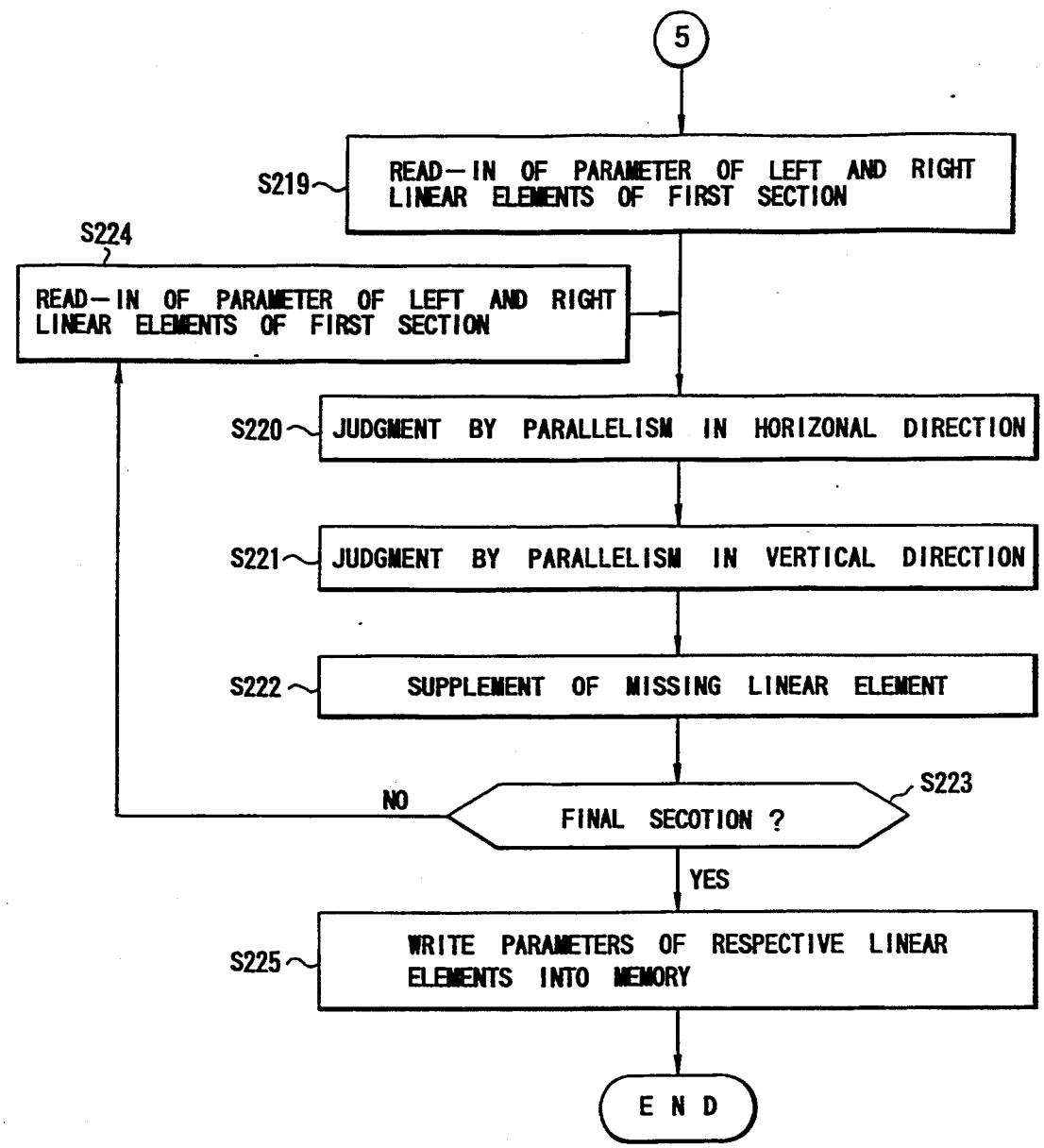
FIG. 34 is a flowchart showing a road shape judgment processing carried out by the road detecting section.
Figure 35:
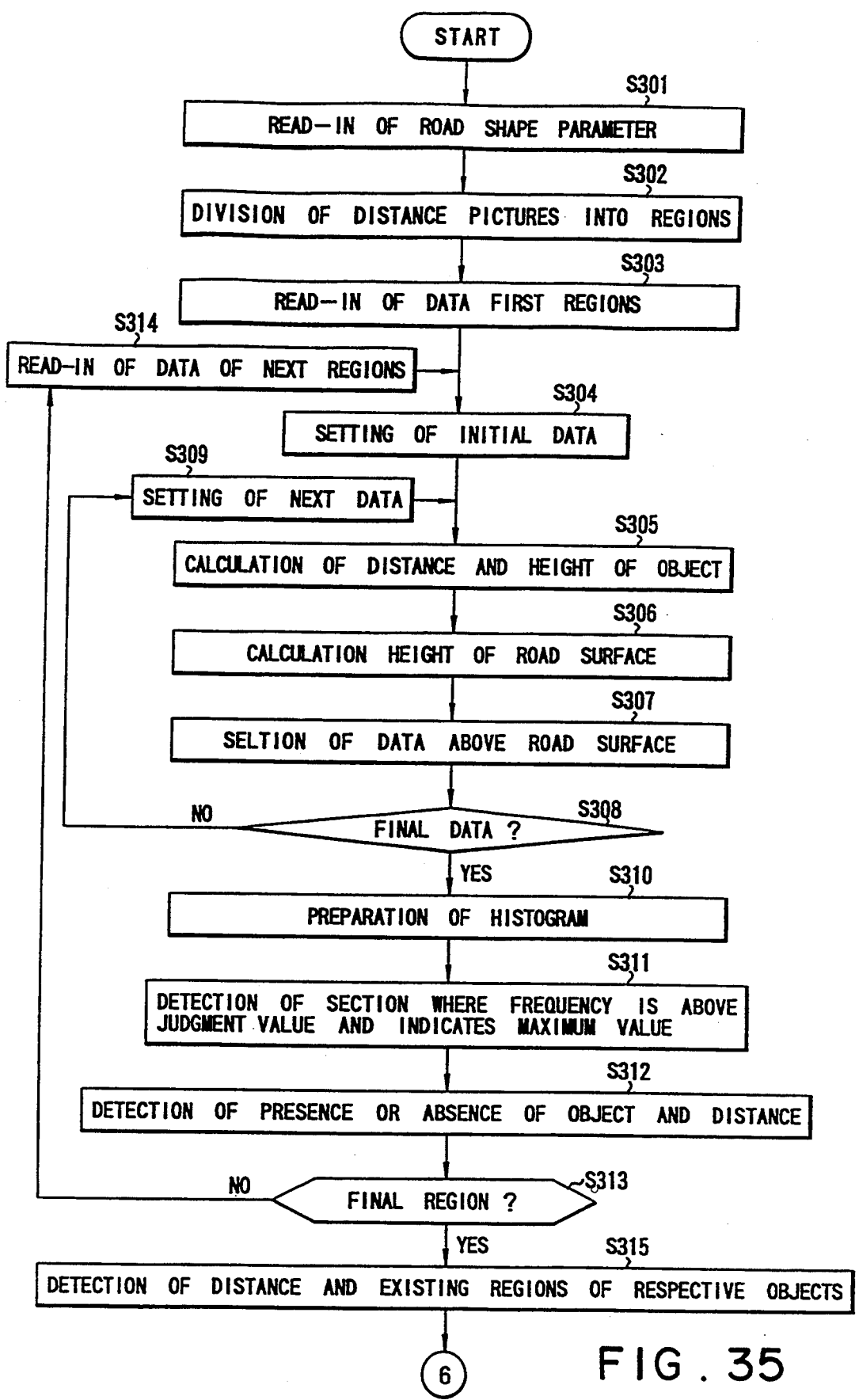
FIG. 35 is a flowchart showing an object detection processing carried out by the object recognition section.
Figure 36:
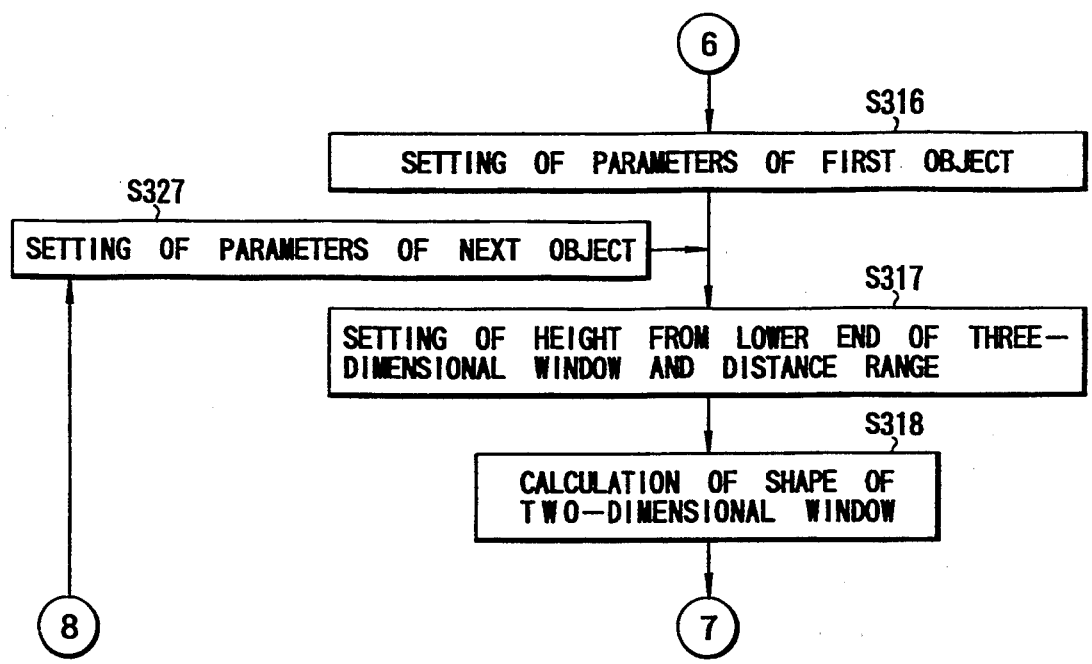
FIG. 36 is a flowchart showing a three-dimensional generation processing carried out by the object recognition section.
Figure 37:
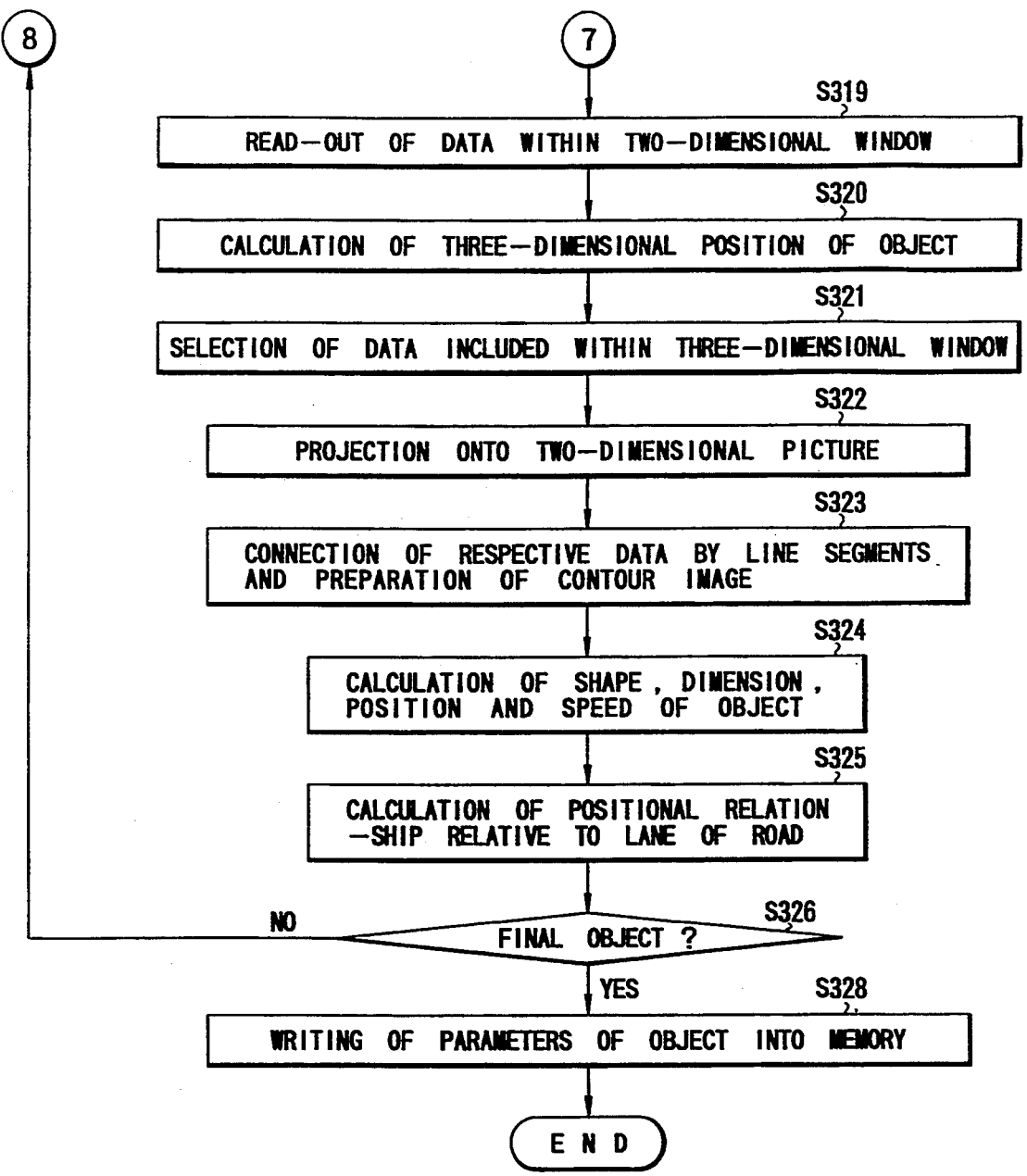
FIG. 37 is a flowchart showing an object contour image extraction processing carried out by the object recognition section.

The timing of the stereoscopic picture processing apparatus 20 will now be described in accordance with the timing chart shown in FIG. 30.

First of all, field signals from the left and right CCD camera 11a and 11b, which are synchronized with each other, are written into the image memories 33a and 33b every 0.1 sec. (at a rate of one per three picture).

Then, the taken-in end signals are received and block transfer starts every four lines. In this block transfer, three blocks are transferred in order of the right picture, left picture and the distance distribution picture of the result.

During this time period, calculation of the discrepancy amount δ is performed with respect to one the input/output buffer memory. After waiting for a predetermined time by taking into consideration the calculation time for the discrepancy amount δ, transfer is started with respect to the other input/output buffer memory.

Since calculation of the city-block distance H with respect to a small region of 4×4 pixels of one right picture is performed while shifting by 100 pixels for the left picture, it is performed 100 times. While the city-block distance H of one region is being calculated, a discrepancy amount δ of the region before that is output as a distance distribution after undergoing various checks.

If the number of lines which have to be processed is 200, then processing for 4 lines will be repeated 50 times. For this reason, there is further required a processing time for an eight line portion in total of the processing time for a four-line portion to transfer initial data at the time of start of calculation, and the processing time for a four-line portion for transferring the final results after the completion of calculation.

The time from the start of transfer of the first input image line until the end of transfer of the final distance distribution is 0.076 sec. from the results of actual circuit operation.

The operation of the road/three-dimensional object detecting apparatus 100 will now be described. More particularly, the operation of the road detecting section 110 will be described in accordance with the flowchart of FIGS. 31–34, and the operation of the object recognition section 120 will be described in accordance with the flowchart of FIGS. 35–37.

The road detecting section 110 first carries out a road shape estimation processing. Namely, when a last road shape parameter (before Δt seconds) is read in at step S201 of FIG. 31, the operation proceeds to step S202 to read in an output signal V of the vehicle speed sensor 3 and an output signal V of the steering angle sensor 4.

When the operation proceeds to the step S203, movement of the vehicle 1 for Δt seconds is calculated by using the output signal V of the vehicle sensor 3 and the output signal of the steering angle sensor 4 which have been read in at the step S202 to estimate a road shape when viewed from the position of the vehicle 1 after Δt seconds to modify the road shape parameters.

When the above-mentioned road shape estimation processing is completed, the operation shifts to the three-dimensional window generation processing. When parameters (a, b, c, d) of the linear element Ld on the left side of the first section R1 of the road model are read in, a three-dimensional window WD3A with the linear element Ld being as a center is set.

Thereafter, the operation proceeds to the step S207 to set a two-dimensional window WD2A on a two-dimensional picture from the three-dimensional window WD3A set at the step S206 to proceeds to the step S208 and those subsequent thereto.

The steps S208–S217 are concerned with a linear element detection processing. When data within the two-dimensional window WD2A is read at step S208, three-dimensional positions of respective data are calculated at step S209, and data where the value of distance Z is within the length of the three-dimensional window WD3A is selected at step S210.

The operation then proceeds to step S211 to compare the linear element Ld of the previously estimated road shape and the three-dimensional positions of an object to calculate amounts of discrepancy ΔX, ΔY in X and Y directions. At step S212, only data where these amounts of discrepancy ΔX, ΔY are within the range of width and height of the three-dimensional window WD3A are selected, and others are rejected.

Thereafter, the operation proceeds to step S213 to determine weighting coefficients of data in dependency upon amounts of discrepancy ΔX, ΔY in X and Y directions calculated at the step S212 to add weighting coefficients corresponding to the amounts ΔX, ΔY of discrepancy to respective data.

When the operation proceeds to the step S214, linear expressions in a horizontal direction (XZ plane) and in a vertical direction (YZ plane) are derived by using the least square method to determine parameters (a, b, c, d) to take them as candidates of a new linear element Ld.

At step S215, whether or not a candidate of the linear element Ld of a line on the right side of a road model is determined is examined. In the case where the result is NO, parameters of the linear element Ld on the right side are read in to return to the previously described step S206. In the case where the result is YES, the operation proceeds to the step S217.

At the step S217, whether or not the determined candidate of linear element Ld is one on the right side of the final section is examined. As a result, in the case the above-mentioned candidate is not one of the final section, parameters of the linear element Ld on the left side of the next section are read in to return to the previously described step S206 to repeat similar processing.

On the other hand, in the case where the candidate of the determined linear element Ld is one on the right side of the final section and candidates of all linear elements Ld constituting a road model have been determined, the operation proceeds from the step S217 to step S219 and those subsequent thereto to execute the road shape judgment processing.

Namely, when parameters of the linear element Ld of the first section R1 are read in at the step S219, each parallelism in a horizontal direction of left and right linear elements Ld is examined to judge reasonableness thereof at the step S220. Further, each parallelism in a vertical direction of left and right linear elements Ld is examined to judge reasonableness thereof.

Thereafter, the operation proceeds to step S222. In the case where any one of left and right linear elements is judged to be unreasonable as the result of the judgment, or in the case where data is lacking because a white line on a road is in a form of broken line or goes out of sight behind an obstacle, so there is no candidate in both left and right linear elements, a linear element on a detected side is subjected to parallel displacement by the width of the vehicle lane, and is substituted therefor, thereby supplementing or compensating missing linear elements. Then, the operation proceeds to the step S223.

It is to be noted that in the case where both left and right linear elements do not exist, the previously estimated linear element of road shape is substituted therefor.

At the step S223, whether or not a corresponding section is the final section is examined. As a result, in the case where that section is not the final section, parameters of left and right linear elements Ld of the next section are read in to return to the previously described step S220. In contrast, in the case of the final section, the operation proceeds from step S223 to step S224 to write parameters of respective linear elements Ld into the output memory 100e at step S225, thus to complete the processing.

The operation of the object recognition section 120 will now be described. First, road shape parameters are read in because of the object detecting processing at step S301. Then, a distance picture from the picture processing apparatus 20 is divided into regions or areas in a lattice form at step S302, and data of the initial area is read in at step S303.

The operation proceeds to step S304, at which the first data within the area is set. At step S305, three dimensional positions (X, Y, Z) of an object, i.e., distance and height are calculated. At step S306, the height from the road surface in the distance Z is calculated. At step S307, data above the road surface is selected.

The operation proceeds to step S308, at which whether or not the present data is the final data is examined. As a result, in the case where the present data is not the final data, the next data within the area is set at step S309. Thereafter, the operation returns to the previously described step S305 to repeat processing. In contrast, in the case of the final data, the operation proceeds from the step S308 to step S310.

The steps S310–S315 are an object detection processing. At the step S310, a histogram is prepared. At step S311, a section where the frequency of this histogram is above a judgment value and indicates a maximum value is detected. As a result, in the case where a section where the frequency of histogram is above a judgment value and indicates a maximum value is detected, it is judged at step S312 that an object exists in that section to detect a distance up to that object.

At step S313, whether or not a corresponding area is the final area is examined. As a result, in the case where that area is not the final area, data of the next area is read in at step S314 to return to the previously described step S304 to continue similar processing. In contrast, in the case where the present area is the final area, the operation proceeds to the step S315 to complete detection of distances and existing areas of respective objects to proceed to the three-dimensional window generation processing of the steps S316–318.

At the step S316, parameters of the first object are set. Then, at the step S317, the height from the lower end of the three-dimensional window and the distance range are set. At step S318, a two-dimensional window WD2B shape is calculated on the basis of the three-dimensional window WD3B. The operation then proceeds to the step S319.

The step S319 and those subsequent thereto are an object contour extraction processing. First, at step S319, data within the two-dimensional window WD2B is read out. At step S320, three-dimensional positions of an object are calculated. At step S321, data included within the three-dimensional window WD3B is selected and extracted.

Thereafter, the operation proceeds to the step S322 to project data extracted at the step S321 onto a two-dimensional picture. At step S323, respective data are connected by line segments to prepare a contour image. Subsequently, at step S324, shape, dimension, position and speed of an object are calculated. At step S325, the positional relationship between a lane of a road and the object is calculated.

At step S326, whether or not the corresponding object is the final object is examined. As a result, in the case where the corresponding object is not the final object, parameters of a next object are set at step S327 to return to the previously described step S317. In contrast, in the case where the present object is the final object, the operation proceeds to step S328 to write parameters such as position, shape, speed and acceleration of respective objects, and the possibility of collision into the output memory 100e to complete the processing.

Figure 38:
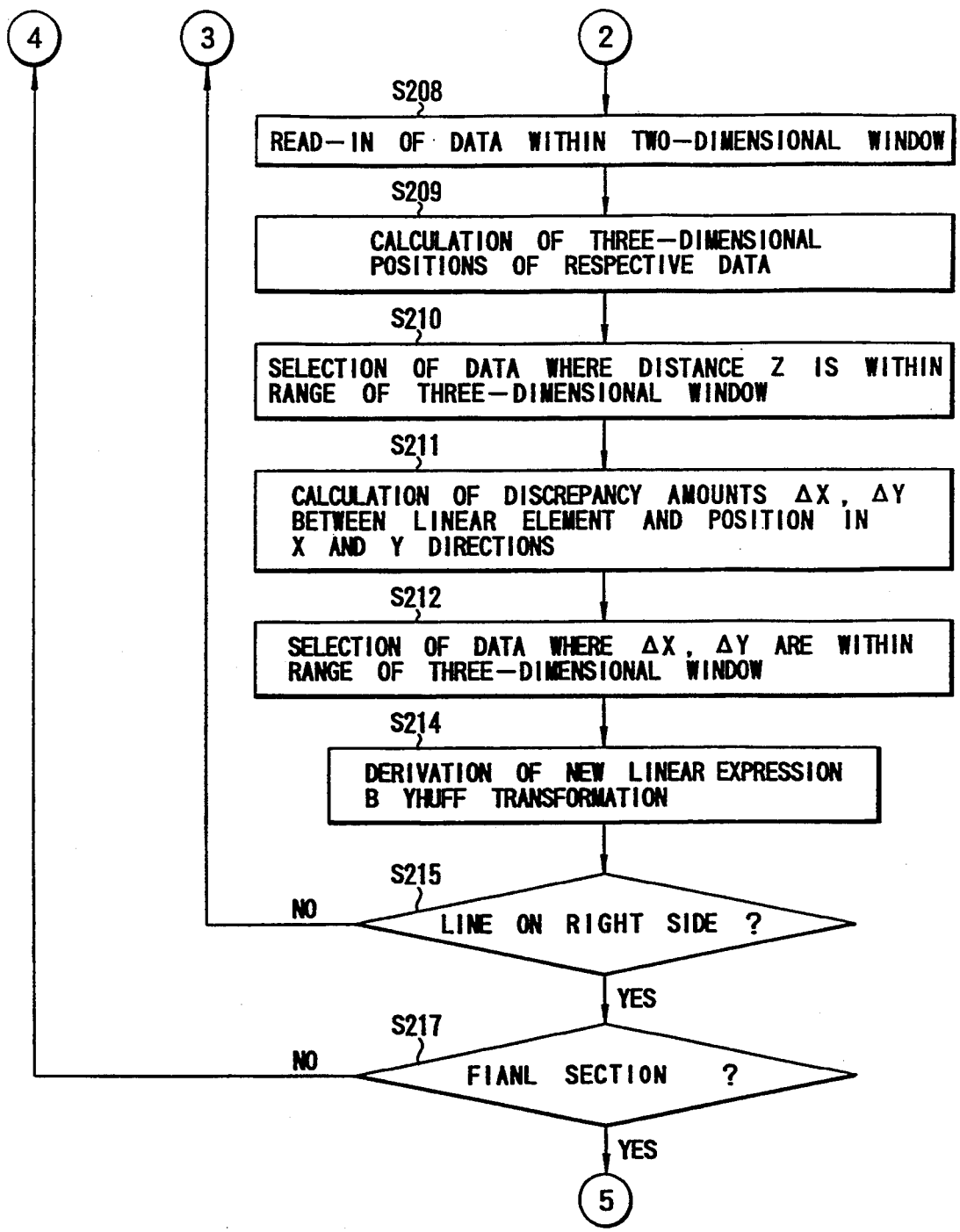
FIG. 38 is a flowchart showing a linear element detection processing carried out by the system for monitoring conditions outside a vehicle of a second embodiment of the present invention.

A second embodiment of this invention will now be described with reference to the flowchart of FIG. 38 showing processing using Hough transformation in calculating parameters of the linear element of the road shape.

The Hough transformation is generally utilized as a technique capable of stably deriving a linear expression from a picture including many noises. The linear element detection processing of the second embodiment is featured below as compared to that of FIG. 33 of the first embodiment previously described. When data within the three-dimensional window WD3A is selected at step S212, the processing procedure proceeds from the step S212 to the step S214 to first carry out the Hough transformation with respect to the relationship data X and Z to derive a linear expression in a horizontal direction (XZ-plane) of the highest accuracy to subsequently carry out the Hough transformation with respect to the relationship between data Y and Z to derive a linear expression in a vertical direction (YZ-plane). Respective parameters a, b, c and d of the linear expression are determined in this way. Thus, the processing procedure proceeds to the previously described step S215 with the above parameters being as a new candidate. Other processing are similar to those of the previously described first embodiment.

While, in this invention, three-dimensional window WD3A is set to thereby exclude data except for white lines, if stain or foreign matter is superposed immediately on a white line in the case of the previously described first embodiment for determining a linear expression by the least square, method there is the possibility that detection accuracy of the white line may be lowered by the influence thereof. However, the Hough transformation is used as in the second embodiment, thereby making it possible to stably derive a linear expression.

Figure 39:
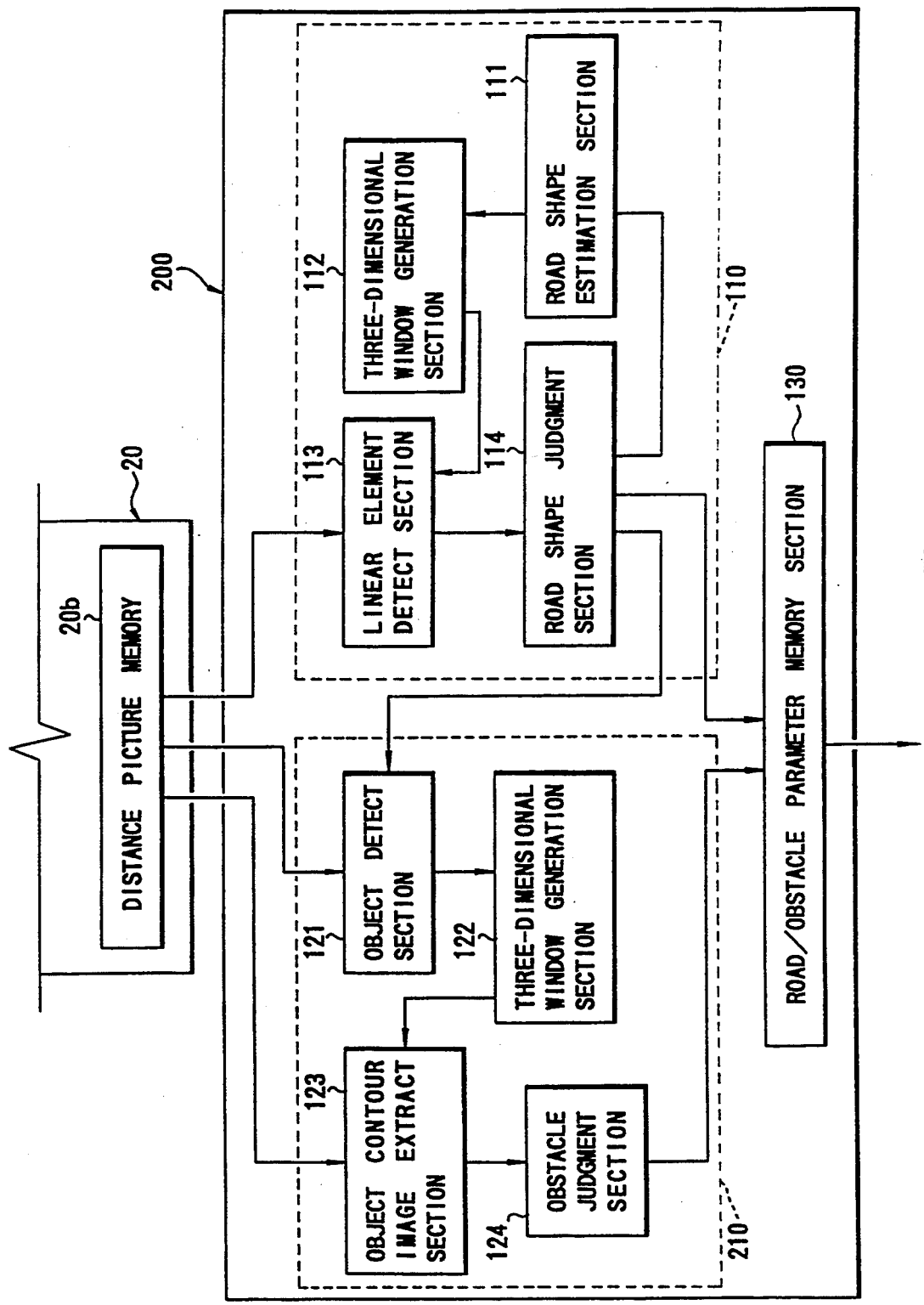
FIG. 39 is a functional block diagram of a road/obstacle detecting apparatus in a system for monitoring conditions outside a vehicle according to a third embodiment of the present invention.

FIG. 39 shows a third embodiment of this invention wherein the previously described road/three-dimensional object detecting apparatus 100 of the first embodiment is constructed as a road/obstacle detecting apparatus 200 to which judgment function for an obstacle is added.

Namely, the road/obstacle detecting apparatus 200 is composed of the previously described road detecting section 110 of the first embodiment, an obstacle detecting section 210, and a road/obstacle parameter memory section 130 comprised of an output memory 100e. The obstacle detecting section 210 is of a structure in which an obstacle judgment section 124 having a function of object discrimination means for discriminating the kind of objects from dimension and position of a contour image of a detected object is supplementally provided within the object recognition section 120 of the first embodiment.

The obstacle judgment section 124 judges what a detected object is from dimensions or running speeds, etc. of respective objects detected at the object contour image extraction section. For example, if the lateral width and the height are respectively greater than about 2 m, an object can be judged to be a truck. Moreover, if the lateral width is 1.3–2.0 m and the height is less than 2 m, an object can be judged as a passenger car.

Further, if the lateral width is 0.5–1.0 m and the height is less than 2 m, an object can be judged as a motorcycle or a pedestrian. In this case, if the running speed is above 20 Km/h, that object can be judged as a motorcycle. In addition, it is also possible to discriminate/classify an object in more detail by using the ratio between the lateral width and the height of a contour image, or the ratio between the height of the entirety of a contour image and the height of a center of area thereof, etc.

In the road/obstacle parameter memory section 130, a parameter of a kind of an object judged at the obstacle judgment section 124 is also stored in addition to parameters such as position, shape or speed, etc. of respective objects detected at the object contour image extraction section 123.

In the third embodiment, an apparatus adapted for predicting collision with an obstacle to give an alarm to a driver or to control brake or steering, thus to automatically avoid collision is further connected to the apparatus of this embodiment, thereby making it possible to more precisely predict not only information of position or speed of a present obstacle but also the condition in several seconds.

For example, there is high possibility that a pedestrian may suddenly change his or her moving direction. On the contrary, there is low possibility that an automobile may change speed or direction. When such actual circumstances are taken into consideration, with the apparatus of the third embodiment, it becomes possible to more precisely predict a manner of movement of an object.

What is claimed is:

1. A system for monitoring conditions outside a vehicle having at least a pair of cameras mounted on said vehicle for taking pictures of one or more objects outside of said vehicle, comprising:

a picture imaging system for imaging said one or more objects in pictures taken by said cameras in a predetermined region outside said vehicle and for generating a picture signal representative of said pictures;

picture processing means responsive to said picture signal for calculating a distance distribution over an entire picture;

first three dimensional window setting means for setting a first three dimensional window representative of a three dimensional space area including a white line of a road imaged by said picture imaging system, based upon an estimated position of the white line on the road;

linear element detecting means responsive to said distance distribution for detecting three-dimensional linear elements within said first three dimensional window and for producing a road model based upon one or more detected linear elements;

road shape judgment means responsive to said road model for judging a reasonableness of said three-dimensional linear elements and for modifying said road model based upon said judging;

road shape estimation means for estimating a position of the white line on the road on a basis of said distance distribution;

object detection means responsive to said distance distribution and said road model for detecting a presence of an object within said entire picture by dividing said picture into a plurality of picture information portions;

second three-dimensional window setting means responsive to a detected object for setting a second three-dimensional window representative of a second three-dimensional space area including an object imaged by said picture imaging system;

object contour image extraction means responsive to said distance distribution and said second three dimensional window for extracting only data within said second three-dimensional window from said plurality of picture information portions in order to derive a contour and a position of a detected object so as to precisely predict a sudden movement of a detected object.

2. The system for monitoring condition outside a vehicle according to claim 1, further comprising:

collision judgment means connected to said object contour image extraction means for judging a possibility of collision between said vehicle and a detected object by referring to a relationship between the detected object and said vehicle from said plurality of picture information portions in view of an obtained running route of said vehicle.

3. The system for monitoring condition outside a vehicle according to claim 2, wherein said linear element detecting means extracts only the data within said first three-dimensional window to multiply the data by a weighting coefficient in order to derive a three-dimensional linear expression with respect to at least one of said three-dimensional linear element by a method of least squares.

4. The system for monitoring condition outside a vehicle according to claim 2, wherein
said linear element detecting means extracts only the data within said first three-dimensional window to multiply the data by a weighting coefficient in order to derive a three-dimensional linear expression with respect to at least one of said three-dimensional linear element by a Hough transformation.

5. The system for monitoring condition outside a vehicle according to claim 2, further comprising
object discrimination means for discriminating a kind of object from a dimension and the position of the contour image of a detected object.

6. The system for monitoring condition outside a vehicle according to claim 1, wherein
said linear element detecting means extracts only the data within said first three-dimensional window to multiply the data by a weighting coefficient in order to derive a three-dimensional linear expression with respect to at least one of said three-dimensional linear elements by a method of least squares.

7. The system for monitoring condition outside a vehicle according to claim 1, wherein
said linear element detecting means extracts only the data within said first three-dimensional window to multiply the data by a weighting coefficient in order to derive a three-dimensional linear expression with respect to at least one of said three-dimensional linear element by a Hough transformation.

8. The system for monitoring a condition outside a vehicle according to claim 1, further comprising
object discrimination means for discriminating a kind of object from a dimension and the position of the contour image of a detected object.

* * * * *